(12) United States Patent
LeBlanc et al.

(10) Patent No.: US 11,879,330 B2
(45) Date of Patent: *Jan. 23, 2024

(54) SYSTEM AND METHODS FOR DOWNHOLE PROPERTY MEASUREMENT

(71) Applicant: Halliburton Energy Services, Inc., Houston, TX (US)

(72) Inventors: Michel Joseph LeBlanc, Houston, TX (US); Bin Dai, Spring, TX (US); James M. Price, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,137

(22) Filed: Jun. 28, 2022

(65) Prior Publication Data

US 2022/0341320 A1 Oct. 27, 2022

Related U.S. Application Data

(63) Continuation of application No. 16/469,556, filed as application No. PCT/US2018/048099 on Aug. 27, 2018, now Pat. No. 11,401,807.

(51) Int. Cl.
*E21B 49/08* (2006.01)
*G01N 21/21* (2006.01)
(Continued)

(52) U.S. Cl.
CPC ........ *E21B 49/0875* (2020.05); *E21B 49/088* (2013.01); *G01N 21/21* (2013.01); *G01N 21/31* (2013.01); *G01N 21/80* (2013.01)

(58) Field of Classification Search
CPC ...... G01N 21/31; G01N 1/4005; G01N 21/64; G01N 21/65; G01N 2001/4016
See application file for complete search history.

(56) References Cited

U.S. PATENT DOCUMENTS

| 5,268,145 A | 12/1993 | Namba et al. |
| 2007/0126594 A1 | 6/2007 | Atkinson et al. |

(Continued)

FOREIGN PATENT DOCUMENTS

| WO | 2015047388 A1 | 4/2015 |
| WO | 2017088069 A1 | 6/2017 |

(Continued)

OTHER PUBLICATIONS

PCT Application Serial No. PCT/US2018/048099, International Search Report, dated May 21, 2019, 4 pages.

(Continued)

*Primary Examiner* — Dennis White
(74) *Attorney, Agent, or Firm* — DeLizio, Peacock, Lewin & Guerra, LLP

(57) ABSTRACT

Embodiments of a device, system and method are disclosed herein. In one embodiment, a device comprises a sample cell configured to interact a fluid sample with an ion selective substrate to modify an optical characteristic of the ion selective substrate according to an ion concentration of the fluid sample, wherein the sample cell is also configured to optically interact an illumination light with the ion selective substrate to generate a sample light; an optical element configured to interact with the sample light to provide a modified light that has a property of the fluid sample; and a detector that receives the modified light and provides an electrical signal proportional to the property of the fluid sample indicated by the modified light; and wherein the ion selective substrate comprises a membrane, the membrane configured to change an optical property in a selected wavelength range, according to the property of the fluid sample.

20 Claims, 14 Drawing Sheets

(51) Int. Cl.
  *G01N 21/31*     (2006.01)
  *G01N 21/80*     (2006.01)

(56) References Cited

U.S. PATENT DOCUMENTS

2009/0009768  A1    1/2009   Jiang et al.
2014/0367092  A1   12/2014   Roberson et al.

FOREIGN PATENT DOCUMENTS

WO      2017131673 A1      8/2017
WO   WO-2017131673 A1 *    8/2017   ........... G01N 1/4005

OTHER PUBLICATIONS

PCT Application Serial No. PCT/US2018/048099, International Written Opinion, dated May 21, 2019, 7 pages.
U.S. Appl. No. 16/469,556, Non-Final Office Action, dated Sep. 3, 2021, 10 pages.

* cited by examiner

SYSTEM AND METHODS FOR DOWNHOLE PROPERTY MEASUREMENT

CLAIM OF PRIORITY

This application is a continuation of U.S. application Ser. No. 16/469,556 entitled "SYSTEM AND METHODS FOR DOWNHOLE PH MEASUREMENT" filed on Jun. 13, 2019, which is a National Stage Entry of PCT Application No. PCT/US2018/048099 entitled "SYSTEM AND METHODS FOR DOWNHOLE PH MEASUREMENT" filed on Aug. 27, 2018.

BACKGROUND

In the field of oil and gas exploration and extraction, measurement of ion concentration in fluids may be performed via complex sampling techniques involving chemical reagents and time-consuming procedures. However, the potential for error and inaccuracies, and the low time resolution of traditional ion measurement techniques, can be impractical in many downhole situations where conditions may change rapidly under harsh environments.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

In the figures, elements or steps having the same or similar reference numerals have the same or similar description and configuration, unless stated otherwise.

DETAILED DESCRIPTION

Figure 1A:
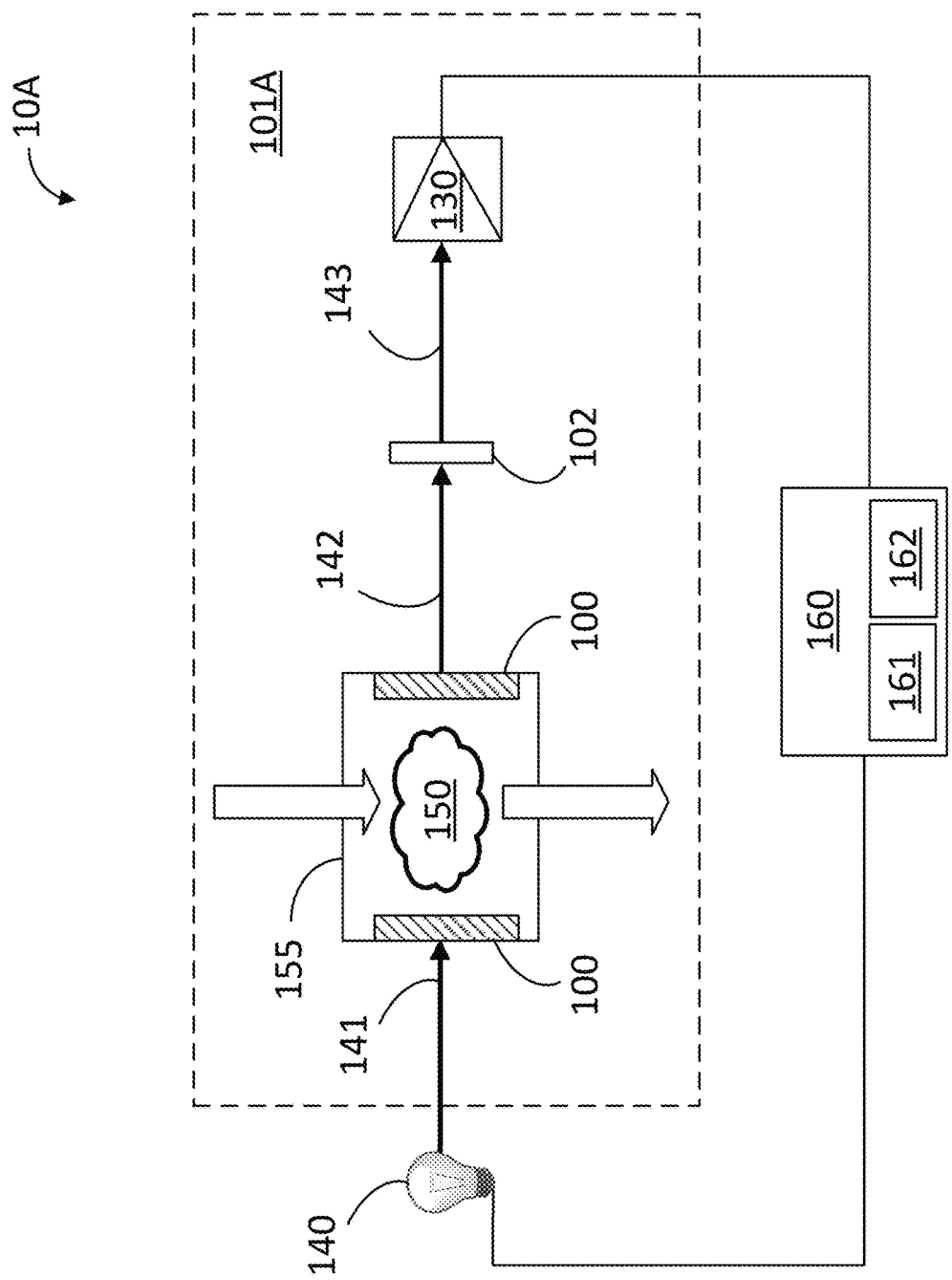
FIG. 1A illustrates a system for measuring an ion concentration of a sample fluid using an optical computing device including an integrated computational element (ICE).

The present disclosure relates to systems, devices, and methods for measuring ion concentrations in sample fluids in the oil and gas exploration and extraction industry. Water is often a by-product of extracted hydrocarbon fluid, and it is desirable to determine where the extracted water comes from within a wellbore. More particularly, water or a water-based solution is often injected into a wellbore as part of the hydrocarbon extraction operation in order to retrieve hydrocarbons or to introduce additives to facilitate drilling and extraction operations. It can be beneficial to establish whether water or a water-based solution produced from a wellbore constitutes water originating from the well or water deliberately injected into the well.

For example, in some embodiments, an additive may be injected into the wellbore with the objective of sealing, repairing, or modifying in some way the hydrocarbon production in certain parts of an extraction well, such as a production zone. Such additives may include, for example, cement. In such situations, it is desirable to know whether the cement is settling in the intended location. Moreover, water-based solutions including different ions may improve the mobility of the oil and thereby its extraction efficiency from the wellbore. Accordingly, different ion solutions are often injected into subterranean formations surrounding the wellbore to facilitate oil extraction. In such configurations, it is desirable to measure which ion arrives first to the wellbore to determine which ion solution worked more efficiently in increasing oil mobility in the surrounding formations. Some production operations proceed by injecting a known ion concentration in the additive fluid, which, upon being measured at the wellbore, provides positive indication of the location of the settlement of the additive fluid within the surrounding formations.

Current downhole measurement techniques tend to address physical properties of samples and fluids, such as mechanical properties, electrical properties, or the chemical identity of certain compounds. Current wellbore technology (e.g., wireline, logging while drilling—LWD—or a permanent completion system) is often used to analyze the chemical makeup of downhole fluids and can determine the presence and relative concentration of several molecules or groups of chemicals such as $CO_2$, asphaltenes, methane, ethane, propane, water, saturates, aromatics, resins, gas/oil ratios (GOR), and $H_2S$. However, in order to understand the chemical status of a downhole operation such as pH, reactivity, and/or chemical stability, a wet chemical analysis is typically performed at the well surface or at an off-field laboratory. Embodiments of the present disclosure provide the capability of undertaking wet chemical analysis downhole within a wellbore in real time.

Embodiments described in the present disclosure extend the sensing advantages of optical computing devices to individual ion species such as, but not limited to, $H^+$, $Na^+$, $Ca^{+2}$ $K^+$, $Mg^{+2}$, $Cr^{+3}$, $HCO_3^-$, $SO^-$, $NH^+$, and $NO_3^-$. Embodiments described herein may facilitate measurement of positive ions (cations) or negative ions (anions) in such ion species depending on the desired target. Optical computing devices as disclosed herein combine integrated computational element (ICE) technology and ion-selective optode technology to monitor in real time ion concentrations of downhole fluids, products, and various chemical and physical properties associated therewith.

An ICE as disclosed herein is an element or device that optically interacts with a substance to determine quantitative and/or qualitative values of one or more physical or chemical properties of the substance. The ICE may include multilayered interference elements designed to operate over a continuum of wavelengths in the electromagnetic spectrum from the ultraviolet (UV, about 290 nm to about 400 nm), visible (about 400 nm to about 800 nm), near-infrared (800 nm to 2500 nm), to mid-infrared (MIR, about 2500 nm to about 10,000 nm) ranges, or any combination or sub-set of those regions. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance or a sample of a substance. A characteristic of a substance may include a quantitative or qualitative value of one or more chemical constituents or compounds present therein, or any physical property associated therewith. Such chemical constituents and compounds may alternately be referred to herein as "analytes." Illustrative characteristics of a substance that can be monitored with the optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, mid-infrared (MIR) and near-infrared radiation (NIR), visible light (VIS), ultraviolet light (UV), X-ray radiation, and gamma ray radiation.

As used herein, the term "optical computing device" refers to an optical device that is configured to receive an input of electromagnetic radiation, to interact the electromagnetic radiation with a substance, and to produce an output of electromagnetic radiation from a processing element arranged within the optical computing device. In some embodiments, an optical computing device also includes a detector to generate an electronic signal indicative of a characteristic of the substance. The processing element may be, for example, an ICE, which is alternately referred to as a multivariate optical element (MOE). The electromagnetic radiation that optically interacts with the processing element is modified so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through, or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

In one or more embodiments, a device includes a sample cell configured to interact a sample with an ion selective substrate to modify an optical characteristic of the ion selective substrate according to an ion concentration of the sample. The sample cell is also configured to optically interact an illumination light with the ion selective substrate to generate a sample light. The device includes an integrated computational element configured to interact with the sample light to provide a modified light that has a property indicative of the ion concentration in the sample, and a detector that receives the modified light and provides an electrical signal proportional to an intensity of the modified light.

In one or more embodiments, a system includes an optical source configured to provide an illumination light, an optical computing device, and a controller. The optical computing device includes an ion selective substrate placed in a sample cell that interacts a sample with the ion selective substrate to modify an optical characteristic of the ion selective substrate according to an ion concentration in the sample. The sample cell optically interacts the illumination light with the ion selective substrate and generates a sample light. The optical computing device also includes an integrated computational element that interacts with the sample light to provide a modified light that has a property indicative of the ion concentration in the sample, and a detector that receives the modified light and provides an electrical signal proportional to the property of the modified light to the controller. The controller is configured to determine the ion concentration in the sample from the property of the modified light.

In one or more embodiments, a method includes allowing an ion exchange between an ion selective substrate and a sample, optically interacting the ion selective substrate with a source light provided by an optical source, to generate a modified light, and detecting a change in an optical response of the ion selective substrate based on the modified light. The method also includes determining an ion concentration in the sample from the change in the optical response of the ion selective substrate, determining a fluid property of the sample from the ion concentration in the sample and a fluid model, and modifying an operational parameter in a wellbore for oil and gas exploration or extraction according to the ion concentration.

FIG. 1A illustrates a system 10A for measuring an ion concentration of a sample fluid 150 using an optical computing device 101A including an ICE 102. Optical computing device 101A includes an ion-selective substrate 100 arranged within an optical path of optical computing device 101A, and coupled to a sample cell 155. Sample cell 155 allows a sample fluid 150 to interact with ion-selective substrate 100 to modify an optical response of ion-selective substrate 100 according to an ion concentration in sample fluid 150. In that regard, ion-selective substrate 100 may be an ion sensitive ion-selective substrate that absorbs a pre-selected type of ion from sample fluid 150 when ion-selective substrate 100 makes contact with sample fluid 150. Accordingly, the affinity of ion-selective substrate 100a for the pre-selected ion depends on the material forming ion-selective substrate 100, including its structural characteristics, such as porosity, the ion charge, the ion mass, the solvent carrying the ion in the fluid (e.g., water, alcohol), and the presence of other ions in the solution (e.g., the pH of a water solution). The affinity of ion-selective substrate 100 for ions in sample fluid 150 also depends on various environmental factors such as temperature and pressure of sample fluid 150. In some embodiments, ion-selective substrate 100 may be an ion-sensing composite material.

The optical path in optical computing device 101A is defined by an illumination light 141 generated by an optical source 140. Sample cell 155 helps facilitate optical interaction of illumination light 141 with ion-selective substrate 100a, thus generating sample light 142. More specifically, sample cell 155 provides a location for the optical interaction between illumination light 141 and ion-selective substrate 100 to take place. In some embodiments, optical source 140 may be a broadband lamp, a laser, a light-emitting diode, or any other source of electromagnetic radiation. In some embodiments, sample light 142 may include fluorescence emitted photons or Raman shifted photons from sample fluid 150.

Integrated computational element (ICE) 102 optically interacts with sample light 142 to provide modified light 143. A property of modified light 143 is indicative of a characteristic of sample fluid 150, such as the ion concentration in sample fluid 150. In some embodiments, the property of the modified light that is indicative of the ion concentration in sample fluid 150 may be an intensity, a polarization state, a phase, a wavelength (e.g., via Raman scattering or fluorescence), or any combination of the above. Optical computing device 101A also includes a detector 130 that receives modified light 143 and provides an electrical signal to a controller 160. In some embodiments, the electrical signal is proportional to the property of modified light 143.

In some embodiments, ICE 102 is configured so that the irradiance of modified light 143 is proportional to the absorbed value of the ion in ion-selective substrate 100a. Accordingly, the absorbed value of the ion in ion-selective substrate 100 may be determined from the amount of modified light 143 arriving to detector 130. In addition, the ion concentration in sample fluid 150 is associated with the ion absorption in ion-selective substrate 100a from a known correlation between the two values. More generally, the position of ICE 102 relative to sample cell 155 may be interchangeable. Accordingly, in some embodiments, ICE 102 may be disposed between optical source 140 and sample cell 155, generating modified light 143 directly from illumination light 141. In such embodiments, ion-selective substrate 100 interacts with modified light 143 to generate sample light 142, which is then measured by detector 130.

According to embodiments consistent with FIG. 1A, at least one side of sample cell 155 is coupled with ion-selective substrate 100a. For example, in some embodiments, a window in sample cell 155 may be coated on the inside (the side that comes into contact with sample fluid 150) with a layer of material forming ion-selective substrate 100. The optical absorption spectrum of ion-selective substrate 100 changes in response to the pre-selected ion. As fluid 150 moves through sample cell 155, it interacts with ion-selective substrate 100, changing the absorption spectrum of sample cell 155 in response to the ion concentration in fluid 150. Accordingly, the intensity of light hitting detector 130 is indicative of the pre-selected ion concentration in sample fluid 150. In that regard, sample fluid 150 may be transparent to illumination light 141. For example, in some embodiments, illumination light 141 only interacts with ion-selective substrate 100.

In some embodiments, sample cell 155 may include a relatively thin fluid passage (about 1 mm thick), through which at least a portion of sample fluid 150 passes for measurement. This may include a wireline-deployed tool such as a reservoir description tool (RDT™), where a pump is used to force fluid 150 through sample cell 155. A controller 160 has a processor 161 and a memory 162. Memory 162 stores data and commands which, when executed by processor 161, cause controller 160 to direct system 10A to perform steps in methods consistent with the present disclosure.

Figure 1B:
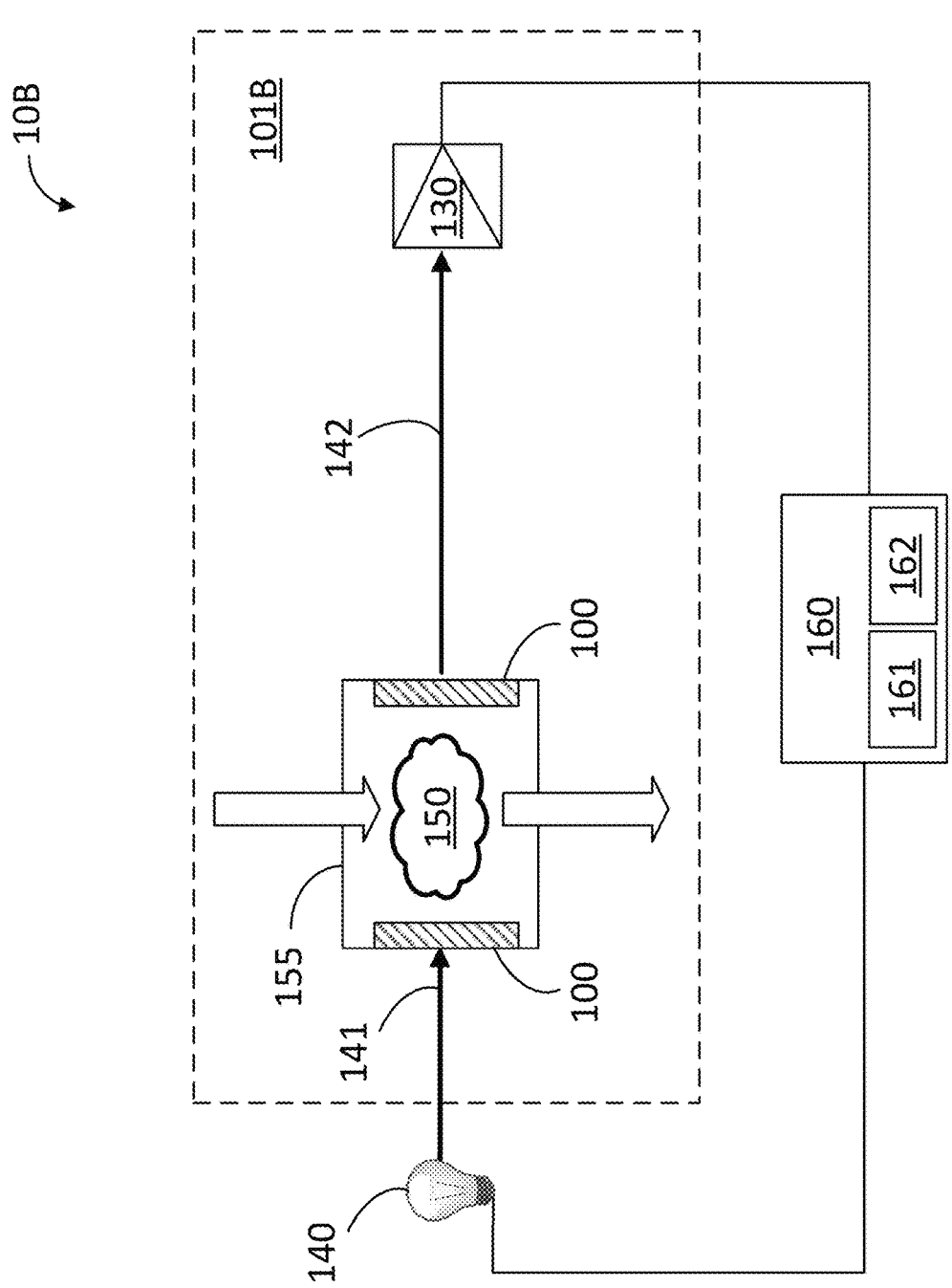
FIG. 1B illustrates a system for measuring an ion concentration of a sample fluid using an optical computing device.

FIG. 1B shows a system 10B for measuring an ion concentration of a sample fluid 150 using an optical computing device 101B. Elements in FIG. 1B having the same reference numeral as in FIG. 1A have the same detailed description as given above, and their description will not be repeated hereinafter. In optical computing device 101B, detector 130 is configured to measure sample light 142 directly and provide an electric signal to controller 160 for processing. In that regard, sample light 142 may provide direct information of the absorbed value of the ion in ion-selective substrate 100, for example when sample light 142 is a fluorescent emission light, or a Raman shifted light. In such configurations, the intensity of the emitted fluorescent light or the intensity of the Raman light may be proportional to the ion concentration in ion-selective substrate 100. Moreover, a wavelength shift in the fluorescence emission or in the Raman emission may be indicative of the ion absorption value in ion-selective substrate 100. In some embodiments, an optical filter (not shown) is used in front of detector 130 to select the range of wavelengths of the sample light needed for the measurement (e.g., Raman spectrum) while removing other wavelengths (e.g., original excitation laser wavelength).

Figure 2:
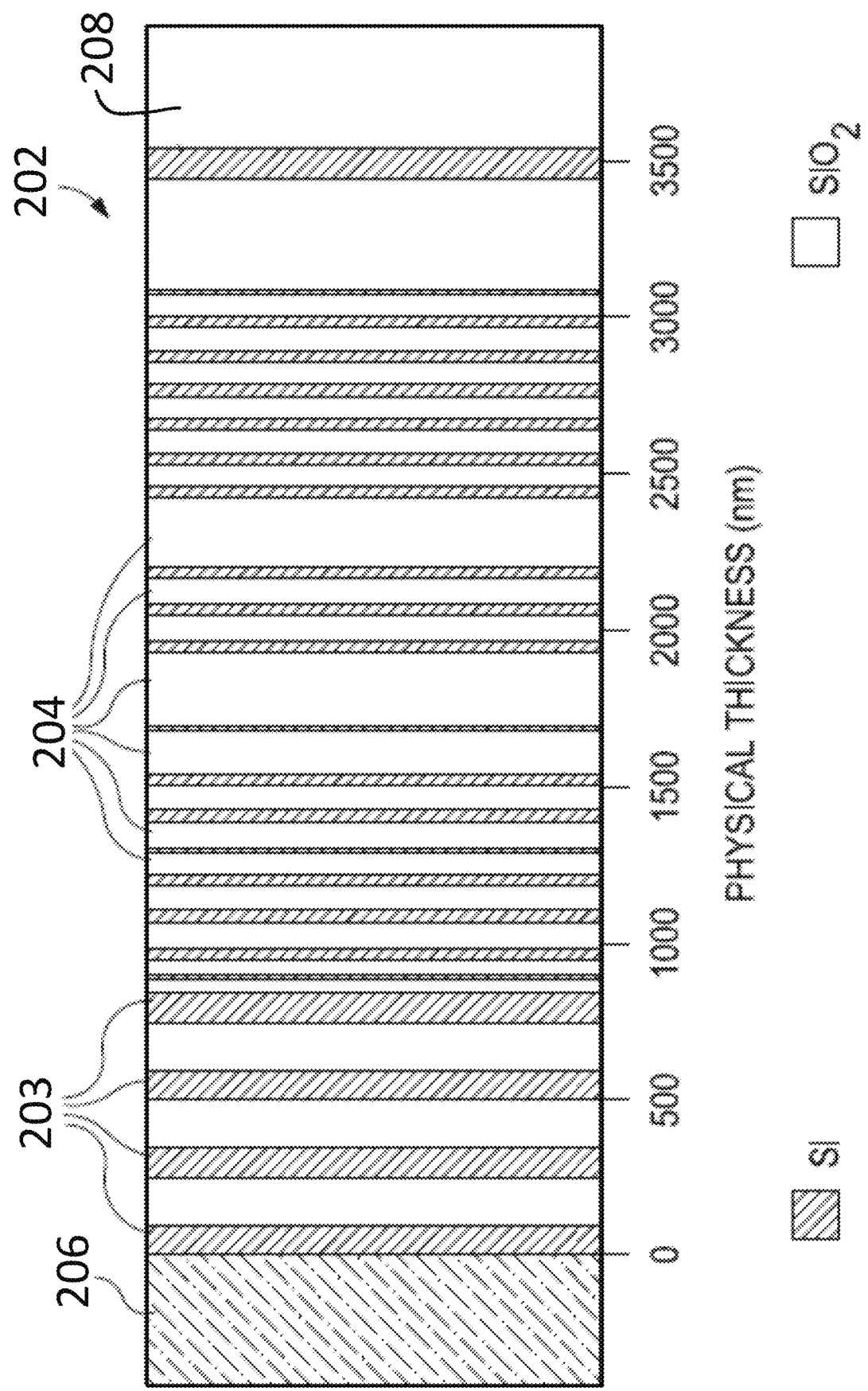
FIG. 2 illustrates a cross-sectional view of an exemplary integrated computational element (ICE) for measuring an ion concentration of a sample fluid.

FIG. 2 illustrates a cross-sectional view of an exemplary integrated computational element (ICE) 202 for measuring an ion concentration in sample fluid 150. ICE 202 may be similar to or the same as ICE 102 of FIG. 1A and, therefore, may be used in optical computing device 101A of FIG. 1A. As illustrated, ICE 202 may include a plurality of alternating layers 203 and 204, such as silicon (Si) and Sift (quartz), respectively. In general, layers 203 and 204 include materials whose index of refraction is high and low, respectively. Other examples of materials for use in layers 203 and 204 might include niobia and niobium, germanium and germania, MgF, SiO, and other high and low index materials known in the art. Layers 203 and 204 may be strategically deposited on an optical substrate 206. In some embodiments, the optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite optical substrate 206 in FIG. 2), ICE 202 may include a layer 208 that is generally exposed to the environment of the device or installation, and may be able to detect a sample substance. In some embodiments, layer 208 may include an ion-selective substrate (e.g., ion-selective substrate 100, cf. FIGS. 1A-1B). In such embodiments, ICE 202 may be disposed in sample cell 155 such that layer 208 makes contact with or is in close proximity to sample fluid 150, thereby allowing the preselected ions to be absorbed in layer 208. In some embodiments, ICE 202 may be deposited on an outer surface of a window in sample cell 155 (cf. FIGS. 1A-1B), and ion-selective substrate 100 may be deposited on an inner surface of the same window. In such embodiments, the window in sample cell 155 may act as a rigid substrate from both ICE 202 and ion-selective substrate 100.

The number of layers 203 and 204 and the thickness of each layer 203 and 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that ICE 202 in FIG. 2 does not in fact represent any particular characteristic of a given substance, but is provided for purposes of illustration only. Consequently, the number of layers 203 and 204 and their relative thicknesses, as shown in FIG. 2, bear no correlation to any particular characteristic. Nor are layers 203 and 204 and their relative thicknesses necessarily drawn to scale, and therefore should not be considered limiting of the present disclosure. Moreover, those skilled in the art will readily recognize that the materials that make up each layer 203 and 204 (i.e., Si and $SiO_2$) may vary, depending on the application, cost of materials, and/or applicability of the material to the given substance being analyzed.

In some embodiments, the material of each layer 203 and 204 can be doped or two or more materials can be combined in a manner to achieve the desired optical characteristic. In addition to solids, ICE 202 may also contain liquids and/or gases, optionally in combination with solids, in order to produce a desired optical characteristic. In the case of gases and liquids, ICE 202 can contain a corresponding vessel (not shown), which houses the gases or liquids. Exemplary variations of ICE 202 may also include holographic optical elements, gratings, frequency selective surfaces, piezoelectric, light pipe, and/or acousto-optic elements, for example, that can create transmission, reflection, and/or absorptive properties of interest.

Layers 203 and 204 exhibit different refractive indices. By properly selecting the materials of layers 203 and 204 and their relative thickness and spacing, ICE 202 may be configured to selectively pass/reflect/refract predetermined fractions of electromagnetic radiation at different wavelengths. Each wavelength is given a predetermined weighting or loading factor. The thickness and spacing of layers 203 and 204 may be determined using a variety of approximation methods from the spectrum of the characteristic or analyte of interest. These methods may include inverse Fourier transform (IFT) of the optical transmission spectrum and structuring ICE 100 as the physical representation of the IFT. The approximations convert the IFT into a structure based on known materials with constant refractive indices.

The weightings that layers 203 and 204 of ICE 202 apply at each wavelength are set to the regression weightings described with respect to a known equation, data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 202, together with detector 130, performs the dot product of the electromagnetic radiation received by ICE 202 (e.g., sample light 142, cf. FIG. 1A) and the wavelength dependent transmission function of ICE 202. The wavelength dependent transmission function of ICE 202 is dependent on the layer material refractive index, the number of layers 203 and 204, and the layer thicknesses. The transmission function of ICE 202 is designed to mimic a desired regression vector derived from the solution to a linear multivariate problem targeting a specific component of the sample being analyzed. As a result, the measured output light intensity of ICE 202 (e.g., the intensity of modified light 143, cf. FIG. 1A) is proportional to a dot product of a transmission spectrum of the sample with the regression vector associated with the characteristic of interest. Accordingly, the measured output light intensity of ICE 202 is a direct indicator of a value of the characteristic of interest of the sample.

Referring again to FIG. 1A, optical computing device 101A employing ICE 102 may be capable of extracting the information of the spectral fingerprint of multiple characteristics or analytes within a substance (e.g., ions dissolved in sample fluid 150) and converting that information into a detectable output regarding the overall properties of the substance. That is, through suitable configurations of the optical computing device 101A, electromagnetic radiation associated with characteristics or analytes of interest in a substance (e.g., ions dissolved in the sample fluid 150) can be separated from electromagnetic radiation associated with all other components of the substance in order to estimate the properties of the substance in real-time or near real-time. Accordingly, ICE 102 is able to distinguish and process electromagnetic radiation related to a characteristic or analyte of interest.

In that regard, optical source 140 may be configured such that sample fluid 150 is transparent to illumination light 141. Accordingly, sample light 142 differs from illumination light 141 only by the optical interaction with ion-selective substrate 100.

Figure 3:
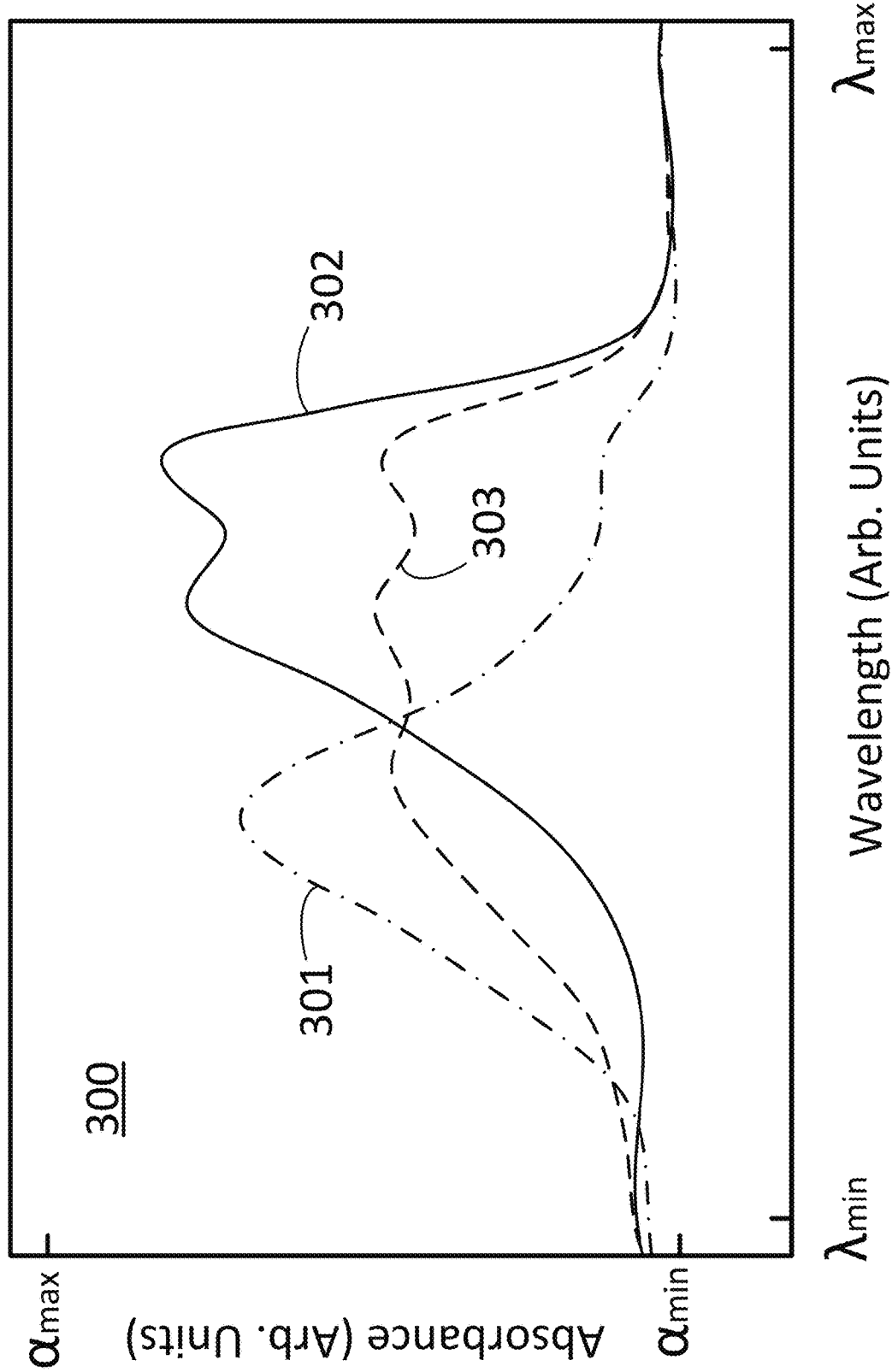
FIG. 3 illustrates spectra of a sample light interacted with an ion-selective substrate when the sample fluid includes three different ion concentrations.

FIG. 3 illustrates spectra of a sample light interacted with an ion-selective substrate when the sample fluid includes three different ion concentrations. A chart 300 includes absorbance spectra 301, 302, and 303 of sample light 142 interacted with ion-selective substrate 100 when the sample (e.g., the sample fluid 150 of FIG. 1A) includes three different ion concentrations. The abscissae in chart 300 correspond to wavelength (in arbitrary units), and the ordinates in chart 300 correspond to absorbance (in arbitrary units). Without limitation, the ordinate axis in chart 300 may indicate a fluorescence or a Raman emission amplitude, and the abscissae may indicate a Raman shift instead of a wavelength.

Spectra 301, 302, and 303 each cover a wavelength range from a minimum wavelength $\lambda_{min}$ to a maximum wavelength $\lambda_{max}$, having an absorbance span from a minimum value, $\alpha_{min}$, to a maximum value, $\alpha_{max}$. In some embodiments, the wavelength span between $\lambda_{min}$ and $\lambda_{max}$ include the visible wavelength range (from about 400 nm to about 750 nm). More generally, either one of $\lambda_{min}$ or $\lambda_{max}$ may be outside the visible wavelength range, such as the ultra-violet UV wavelength range (from about 290 nm to about 400 nm) and the near-infrared wavelength range (from about 750 nm to about 2500 nm).

Spectrum 301 represents zero or very low concentrations of the pre-selected ion, while a high concentration of the pre-selected ion results in spectrum 302. Spectrum 303 corresponds to an intermediate ion concentration between the high (302) and low (301) ion concentrations in fluid 150. The ions being detected in this case are positively-charged and their presence in the fluid results in an exchange with a hydrogen ion (also positively charged) bonded to a chromo-ionophore (dye) molecule in ion-selective substrate 100. Spectra 301 and 302 are markedly different from one another, and therefore suitable for the spectral regression analysis with ICE 102 to determine the absorbed value of the ion in ion-selective substrate 100.

An advantage of system 10A is the capability of ion-selective substrate 100 to operate at high temperatures such as 100° C., 150° C., 200° C., 250° C., or even higher. The high temperature resilience of ion-selective substrate 100 is a desirable property for downhole measurement tools. The speed at which ion-selective substrate 100 reaches equilibrium with ions dissolved in fluid 150, and the amount of ions absorbed into ion-selective substrate 100 upon equilibrium is determined by the equilibrium constant $K_a$ of ion-selective substrate 100. The $K_a$ constant is a factor that generally depends on the temperature, pressure, and pH of sample fluid 150, and also on other conditions such as the material forming ion-selective substrate 100, its porosity, mass, and charge of the pre-selected ion, among other factors. In that regard, some embodiments of ion-selective substrates 100 may include a diffusion barrier to delay the absorption of the pre-selected ions from sample fluid 150. In such embodiments, the optical measurement described in systems 10A or in system 10B may be performed before the ion concentration between sample fluid 150 and ion-selective substrate 100 has reached equilibrium. Accordingly, controller 160 may be configured to measure the speed or rate of ion absorption into ion-selective substrate 100 from sample fluid 150. In turn, the speed or rate of absorption may be used to determine a characteristic of sample fluid 150, such as a water concentration (i.e., "water cut" measurement, as in ion selective fiber sensors for determining the water cut in wellbore-related fluids).

Figure 4:
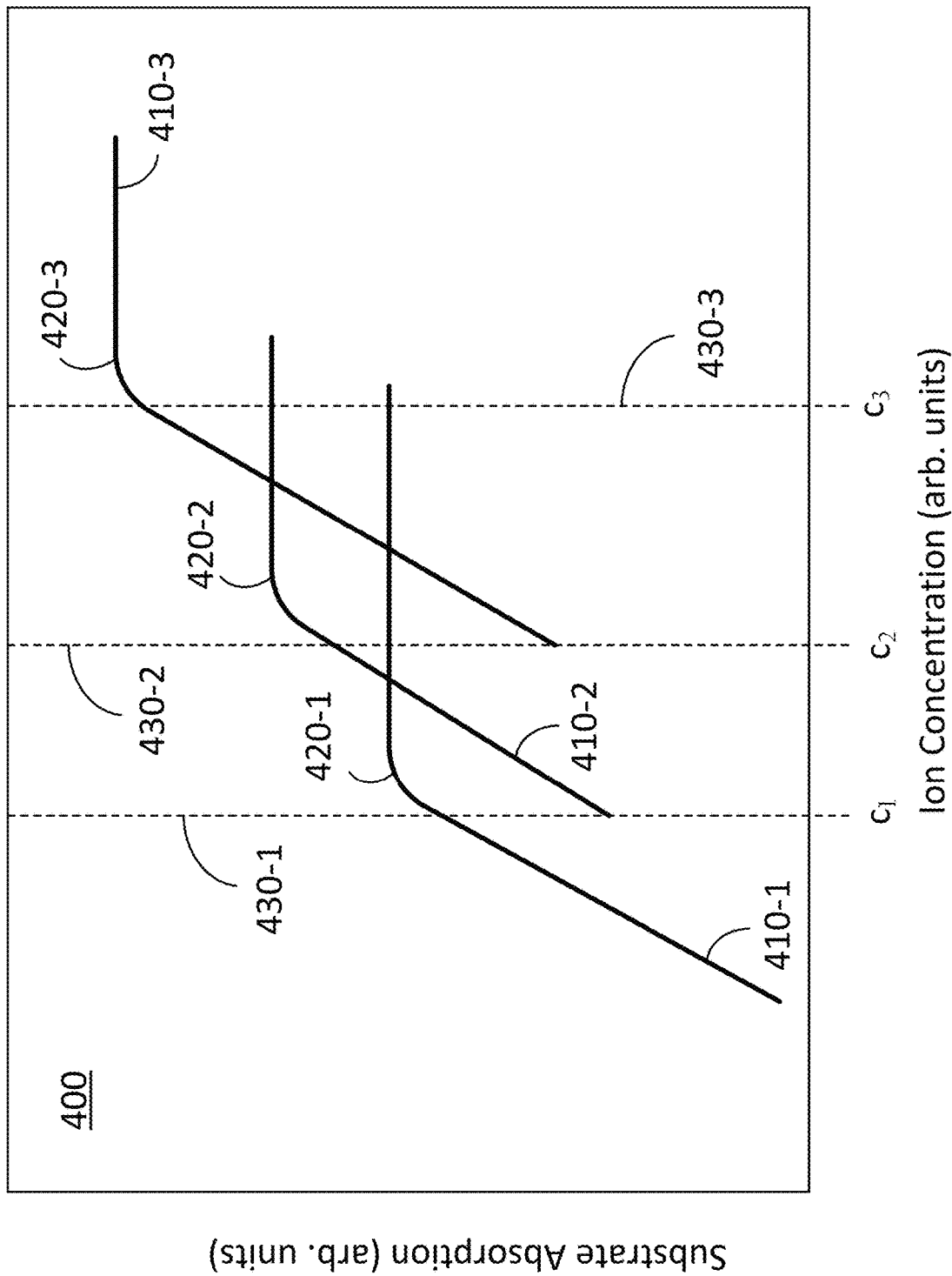
FIG. 4 illustrates a chart of ion-selective absorption in substrates, based on an ion concentration of a sample, according to some embodiments.

FIG. 4 illustrates a chart 400 of ion-selective absorption in substrates, based on an ion concentration of a sample, according to some embodiments. The abscissae (X-axis) in chart 400 include ion concentration (in arbitrary units), and the ordinates (Y-axis) include substrate absorption (in arbitrary units). Different substrates lead to different absorption curves 410-1, 410-2, and 410-3 (hereinafter, collectively referred to as "curves 410"). Curves 410 show a characteristic linear behavior of absorption up to a capping point 420-1, 420-2, and 420-3 (hereinafter, collectively referred to as "capping points 420"). When the ion concentration (e.g., the pH of a fluid sample) reaches capping points 420, the substrate is saturated and little or no absorption is obtained for higher values of ion concentration.

In some embodiments, it is generally expected that an optical property of the substrate has a linear response for at least a portion of the scale in the substrate absorption. For example, when more ions are absorbed in a membrane, it may be expected that the optical absorption or emission band of the membrane may shift linearly toward longer or shorter wavelengths, or increase/decrease proportionally in magnitude. Such effects of an ion absorbance in the optical properties of the substrate may be captured by using a suitably designed ICE and a selected illumination light, as disclosed herein.

Moreover, as curves 410-1, 410-2, and 410-3 indicate, different materials in the ion-selective substrates may have different 'cutoff' ion concentrations 430-1 (c1), 430-2 (c2), and 430-3 (c3), hereinafter collectively referred to as "cutoff concentrations 430"), respectively. Cutoff concentrations 430-1, 430-2, and 430-3 indicate a value of ion concentration where a specific material becomes saturated and the substrate absorption response becomes nonlinear (e.g., shortly before, or on, capping points 420). Accordingly, embodiments as disclosed herein combine one or more materials as illustrated in chart 400 into one or more ion-selective substrates for an optical computing device to extend the linear regime for substrate absorption from c1 430-1, including c2 430-2, up to c3 430-3.

Figure 5:
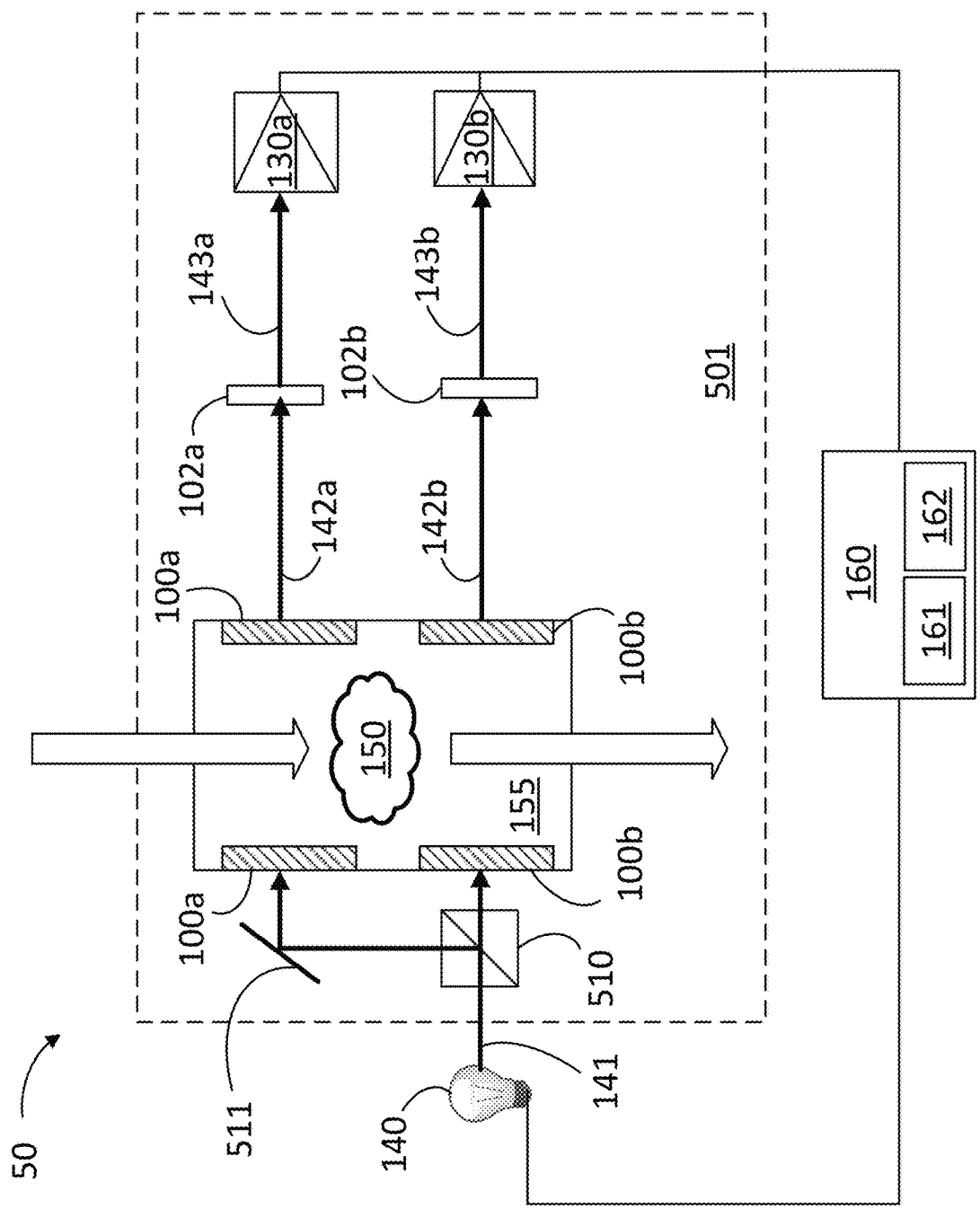
FIG. 5 illustrates a system for measuring a plurality of ion concentrations of a sample fluid using an optical computing device.

FIG. 5 illustrates a system 50 for measuring a plurality of ion concentrations of sample fluid 150 using an optical computing device 501. Elements in system 50 having the same reference numeral as elements in system 10A have the same configuration and description as provided above.

System 50 includes two ion-sensitive ion-selective substrates 100a and 100b, each with an affinity optimized for a different ion. For example, ion-selective substrate 100a may be optimized for $Ca^{+2}$ (calcium), whereas ion-selective substrate 100b may be optimized for $K^+$ (potassium). Beam-splitter 510 separates illumination light 141 into a first portion reflected by mirror 511 and passing through ion-selective substrate 100a, and a second portion passing through ion-selective substrate 100b. In that regard, sample light 142a may include a response from ion-selective substrate 100a and sample light 142b may include a response from ion-selective substrate 100b. Each ICE 102a and 102b optically interacts with sample light 142a and 142b, providing modified light 143a and 143b to detectors 130a and 130b, respectively. Modified light 143a includes a property indicative of a Ca' concentration and modified light 143b includes a property indicative of a $K^+$ concentration in fluid 150. In some embodiments, ICEs 102a and 102b may be replaced by standard bandpass filters, or may be taken out from optical computing device 501 altogether.

In some embodiments, for example, ion-selective substrate 100a may have a neutral response to sample fluid 150 and ICE 102a may be replaced by a neutral density filter. Accordingly, modified light 143a may be a reference light, and detector 130a may provide a reference measurement to controller 160.

The above-described embodiments may be applied to any two ion concentrations other than $Ca^{+2}$ and $K^+$. Further, the number of different ions measured is not limiting of the embodiments disclosed herein and two, three, or more different ions may be pre-selected for measurement.

Figure 6A:
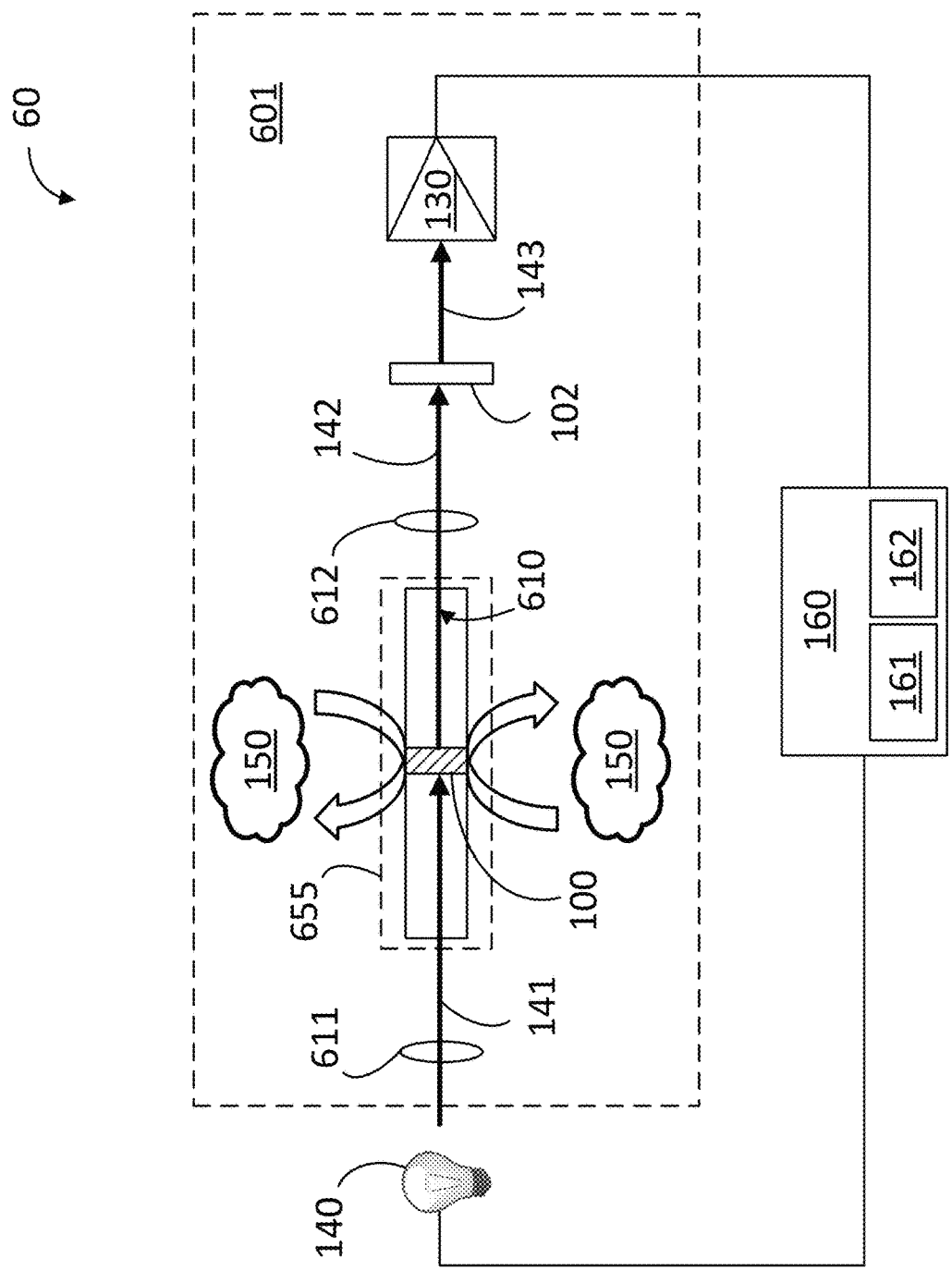
FIG. 6A illustrates a system for measuring an ion concentration of a sample fluid using an optical computing device that includes an optical waveguide.

FIG. 6A illustrates a system 60 for measuring an ion concentration of sample fluid 150 using an optical computing device 601 including an optical waveguide 610. Controller 160, processor 161 and memory 162 are as described above in reference to systems 10 and 50 (cf. FIGS. 1A-B and 5). Ion-selective substrate 100 forms a layer interposed in the propagation path of optical waveguide 610, forming a sample cell 655. In some embodiments, sample cell 655 may be dipped into sample fluid 150, rapidly generating an ion-exchange with ion-selective substrate 100, in at least a sample portion of the waveguide. Accordingly, ion-selective substrate 100 may be arranged within the sample portion of the waveguide to facilitate the ion exchange. Accordingly, in a tool with a large flow area such as in a permanent completion wellbore, sample cell 655 is easily exposed to sample fluid 150, rather than coaxing a properly mixed, representative sample to flow through a tiny sample cell 655.

Waveguide 610 may be an optical fiber having a diameter of a few tens of microns (1 μm=$10^{-6}$ m), a glass rod having a thicker diameter than a fiber, a light pipe of a few mm in diameter, or any type of optical waveguide configured to propagate illumination light 141 with a low loss.

In some embodiments of system 60, waveguide 610 includes a length of small diameter fiber or other optical waveguide wherein a short, longitudinal section of ion-selective substrate 100 is sandwiched between (interposes) two axially adjacent portions of the waveguide 610. Focusing optics 611 convey illumination light 141 into waveguide 610 and expanding optics 612 receive and expand the resulting sample light 142, and provide sample light 142 to ICE 102 before reaching detector 130. In some embodiments, optical source 140 and optical computing device 601 are contained within a pressure vessel. Thus, the flexibility of waveguide 610 enables adapting optical computing device 601 to any arbitrary shape with waveguide 610 routed outside of the pressure vessel and exposed to a large diameter flow area inside the wellbore. Wellbore fluids (e.g., sample fluid 150) can wash over waveguide 610 and thereby interact with ion-selective substrate 100. Ions in fluid sample 150 change the optical absorption spectrum of ion-selective substrate 100 and allow ICE 102 and detector 130 to determine the concentration of the target ion (cf. spectra 301, 302, and 303, cf. FIG. 3).

Figure 6B:
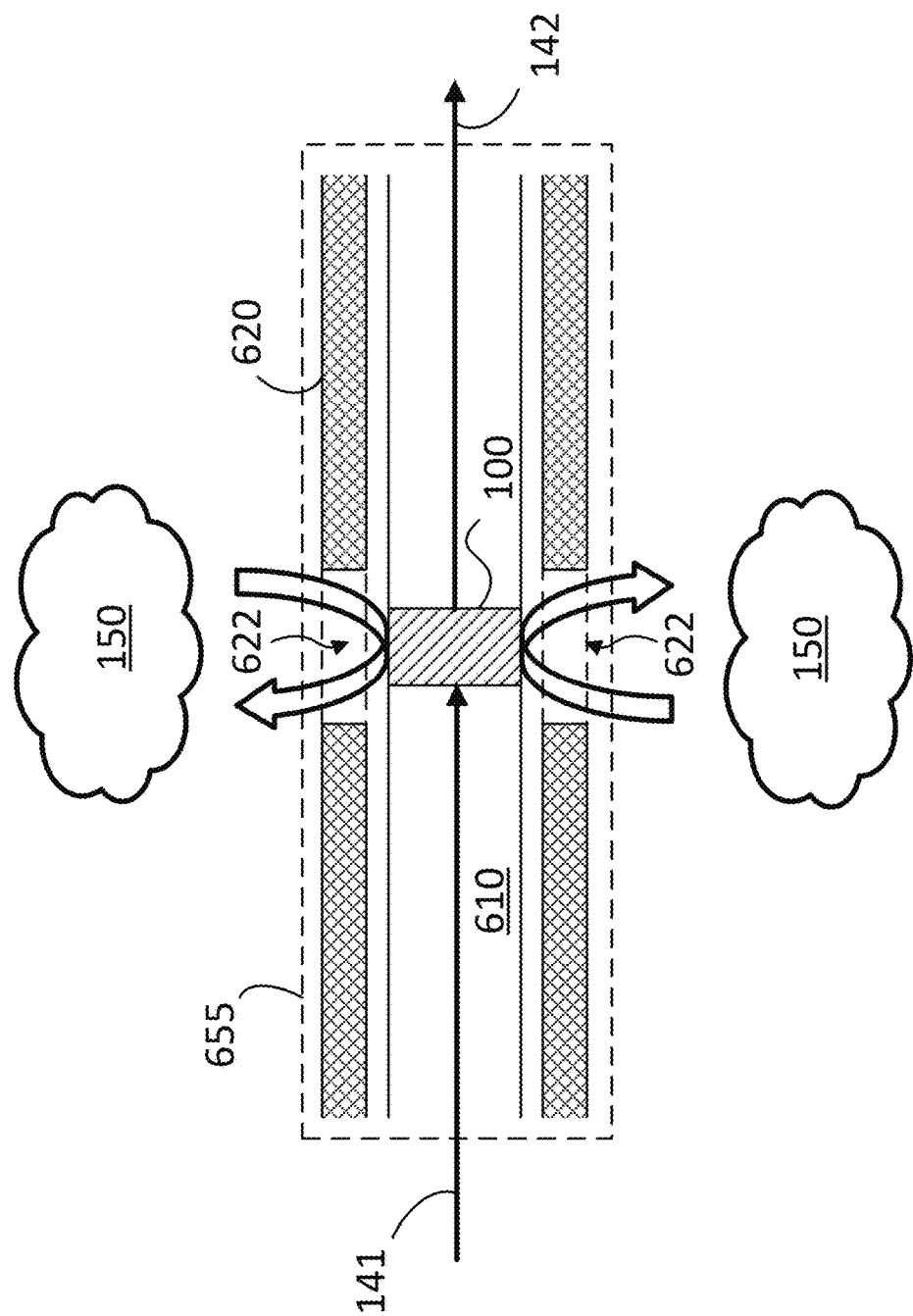
FIG. 6B illustrates an optical waveguide including an ion-selective substrate for use in an optical computing device for measuring an ion concentration of a sample fluid.

FIG. 6B illustrates optical waveguide 610 including ion-selective substrate 100 for use in optical computing device 601 (FIG. 6A) for measuring an ion concentration of sample fluid 150. FIG. 6B shows a more detailed schematic of sample cell 655, which, in some embodiments, includes a protective sleeve 620 covering waveguide 610 and providing one or more slots 622 to allow sample fluid 150 to interact with ion-selective substrate 100. Since the diameter of waveguide 610 is small, ion-selective substrate 100 absorbs ions from sample fluid 150, altering its optical absorbance/transmittance spectrum. Some embodiments include additional support on either end of waveguide 610 to keep optical computing device 601 together, even without adhesively bonding ion-selective substrate 100 to the two waveguide portions shown in the figure. For example, ion-selective substrate 100 may be painted, coated, or deposited on one side of waveguide 610, while the other side of waveguide 610 is abutted on the free side of ion-selective substrate 100.

The material forming ion-selective substrate 100 may have in general a different index of refraction ($n_e$) than that of waveguide 610. This may produce fringing effects in sample light 142, as in a Fabry-Pérot interferometer. In some embodiments, illumination light 141 is a broadband light with a coherence length desirably shorter than the thickness of ion-selective substrate 100. Some embodiments may tolerate a limited degree of interference fringes resulting from the finite thickness of ion-selective substrate 100. To mitigate interference and loss effects, in some embodiments, it is desirable that the thickness of ion-selective substrate 100 in waveguide 610 be larger than the coherence length of illumination light 141, or the propagating wavelength of illumination light 141. In other embodiments, the surfaces of ion-selective substrate 100 are not parallel in order to avoid Fabry-Perot effects.

Figure 7:
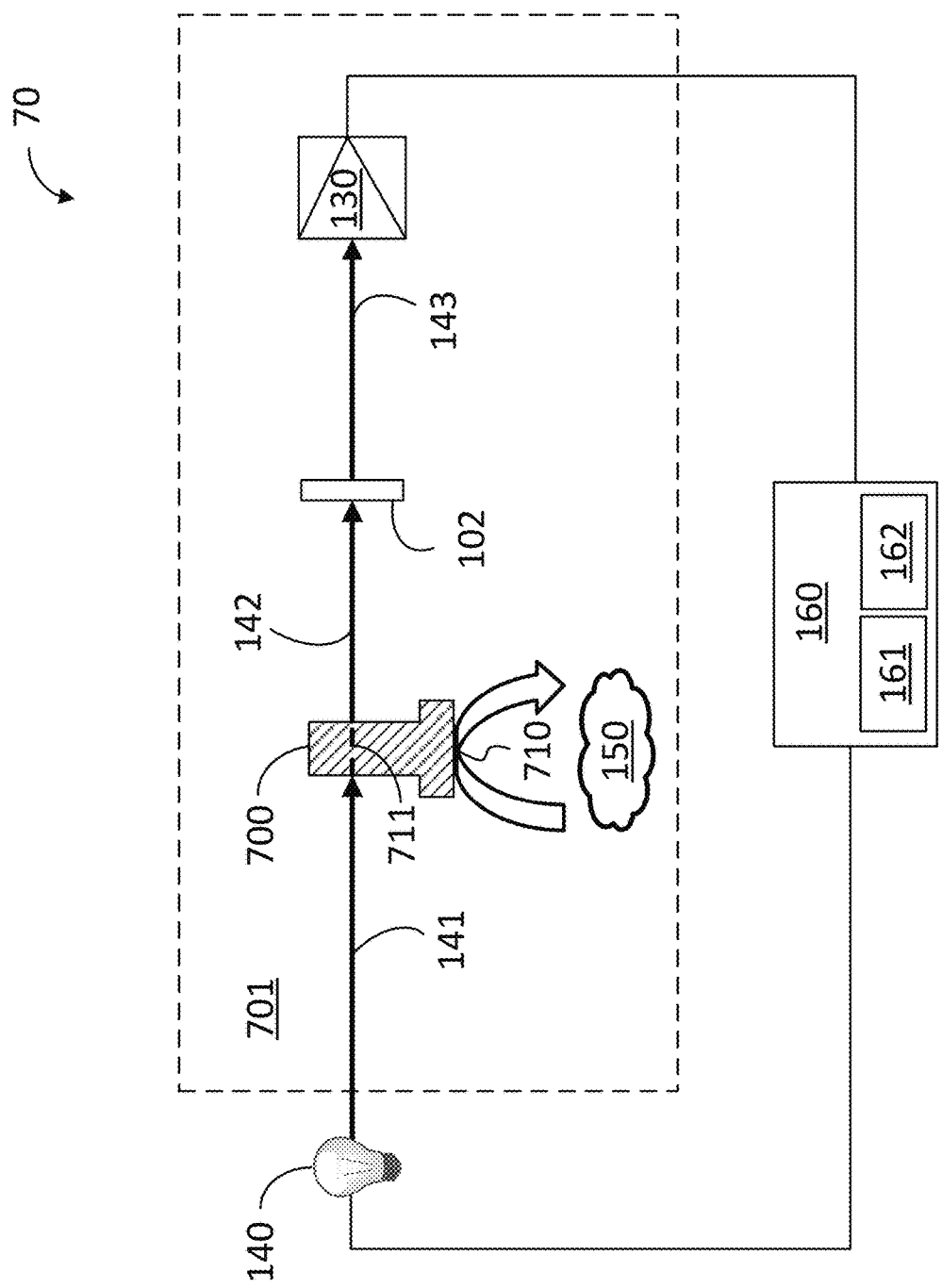
FIG. 7 illustrates a system for measuring an ion concentration of a sample fluid using an ion-selective substrate that interacts with a sample in a first point and interacts with an illumination light in a second point.

FIG. 7 illustrates a system 70 for measuring an ion concentration of sample fluid 150 using optical computing device 701. Elements in system 70 having the same reference numeral as elements in systems 10A-B, 50 and 60 have the same configuration and description as provided above (cf. FIGS. 1A-B, 5 and 6). Optical computing device 701 includes an ion-selective substrate 700 that interacts with sample fluid 150 in a first region 710 and interacts with illumination light 141 in a second region 711. In system 70, ion-selective substrate 700 is disposed along the optical path (train) of illumination light 141. ICE 102 interacts with sample light 142 adjacent region 711 to produce modified light 143, which is subsequently detected by detector 130. Ion-selective substrate 700 extends beyond the optical path of illumination light 141 into region 710, where it is able to physically interact with fluid 150. Ion-selective substrate 700 absorbs ions from fluid 150, which diffuse from region 710 into region 711. Sample light 142 is generated when illumination light 141 interacts with ion-selective substrate 700 in region 711.

Detector 130 may be configured to perform measurements after equilibrium in between ions adsorbed in ion-selective substrate 100 and the ion concentration in sample fluid 150 has been reached. Alternatively, detector 130 may perform measurements during an ion diffusion transient between ion-selective substrate 100 and fluid 150. For example, in some embodiments, detector 130 may describe in detail the transient speed, which may be indicative of a characteristic of fluid 150. For example, in some embodiments, the transient speed may be associated with the presence of water or oil in fluid 150. In that regard, a higher transient speed fluid 150 may be associated with a fluid 150 having more water, or less oil, than a slower transient speed fluid 150.

Figure 8:
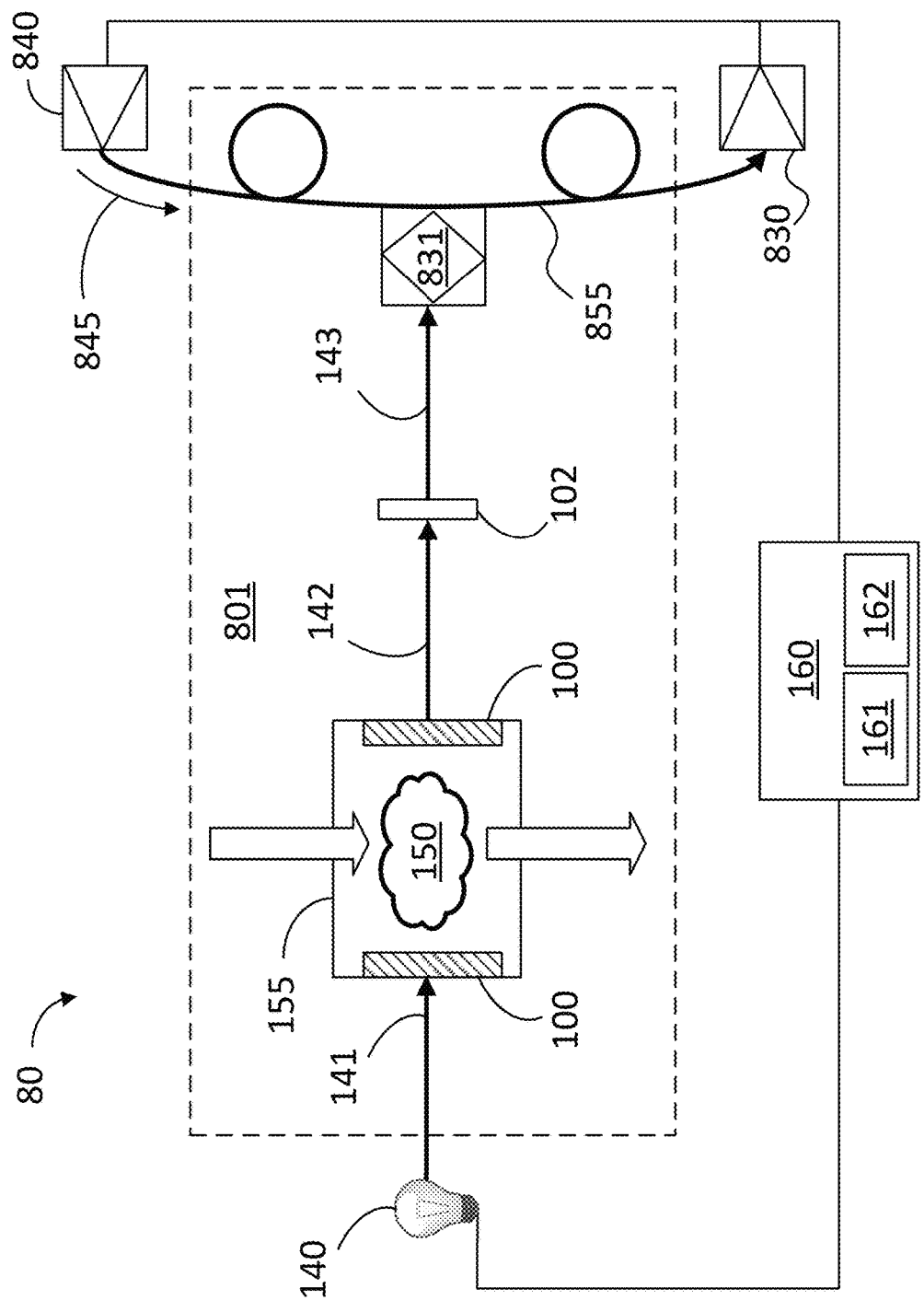
FIG. 8 illustrates a system for measuring an ion concentration of a sample fluid using an ion-selective substrate and a transducer to modulate a signal in a fiber-optic telecommunication wavelength.

FIG. 8 illustrates a system 80 for measuring an ion concentration of a sample fluid using an ion-selective substrate and a transducer to modulate a signal in a fiber-optic telecommunication wavelength, according to some embodiments. Elements in system 80 having the same reference numeral as elements in systems 10A-B, 50, 60 and 70 have the same configuration and description as provided above (cf. FIGS. 1A-B, 5, 6 and 7). System 80 also includes an optical computing device 801, including a sample cell 155 configured to interact a sample fluid 150 with an ion selective substrate 100 to modify an optical characteristic of the ion selective substrate 100 according to an ion concentration of the sample. Sample cell 155 is also configured to optically interact an illumination light 141 with the ion selective substrate 100 to generate a sample light 142. Optical computing device 801 includes an ICE 102 configured to interact with the sample light 142 to provide a modified light 143 that has a property indicative of the ion concentration in sample fluid 150 (e.g., ICE 202, cf. FIG. 2). In some embodiments, optical computing device 801 also includes a transducer 831 that receives the modified light and provides an electrical signal proportional to an intensity of modified light 143. In some embodiments, a modulation mechanism may include a Fiber Bragg Grating acting as a bolometer.

In some embodiments, transducer 831 is configured to modulate a signal 845 in a fiber-optic telecommunication wavelength based on the electric signal proportional to the intensity of the modified light. For example, in some embodiments, transducer 831 may include an acousto-optic modulator to convert the electrical signal from the intensity of the modified light into a phase-shifting signal in an optical fiber 855 transmitting a signal 845.

Signal 845 may be provided by a second optical source 840, and coupled into optical fiber 855. The modulation of signal 845 induced by transducer 831 may be detected by a detector 830. In some embodiments, second optical source 840 is configured to provide signal 845 including a light at a wavelength that may be coupled into a long-haul single mode optical fiber 855, thus allowing signal 845 to traverse a long distance (e.g., from a surface station to the bottom of a wellbore in an oil rig for a wireline or LWD operation). Moreover, in some embodiments, optical fiber 855 may include a distributed network of optical computing devices 801 over an extended area (e.g., a wellbore including multiple extraction reservoirs and boreholes in an oil rig deployment).

Figure 9A:
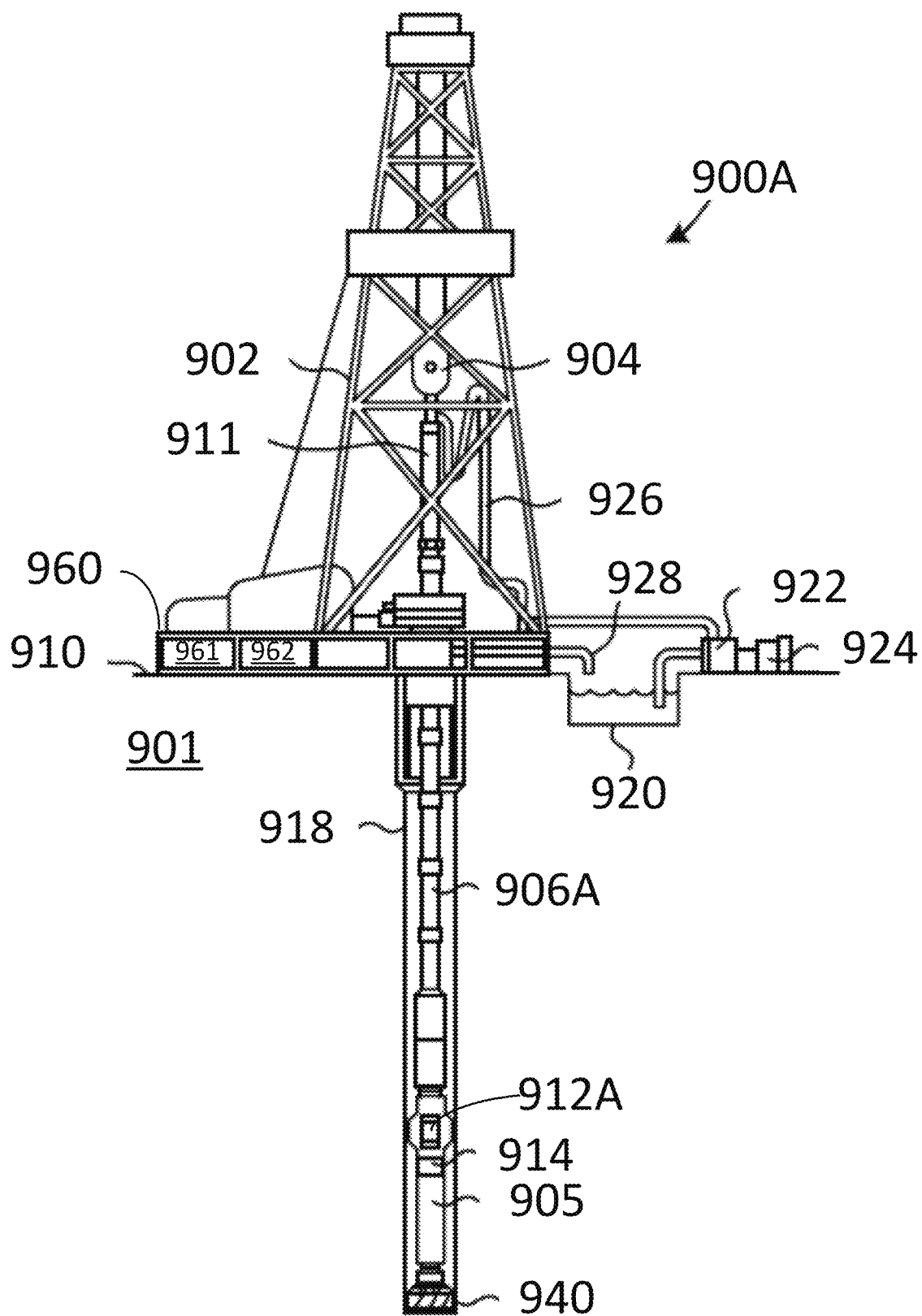
FIG. 9A illustrates a drilling system configured with at least one sensing tool having an optical computing device in a measurement-while-drilling (MWD) or logging-while-drilling (LWD) operation.

FIG. 9A illustrates a drilling system 900A configured with at least one sensing tool 912A having an optical computing device 914 in a measurement-while-drilling (MWD) or logging-while-drilling (LWD) operation (e.g., optical computing devices 101, 501, 601, 701 or 801 cf. FIGS. 1, and 5-7). A wellbore 918 may be created by drilling into the earth 901 using drilling system 900A. Drilling system 900A may be configured to drive a bottom hole assembly (BHA) 905 positioned or otherwise arranged at the bottom of a drill string 906A extended into the earth 901 from a derrick 902 arranged at the surface 910. The derrick 902 includes a Kelly 911 and a traveling block 904 used to lower and raise the Kelly 911 and the drill string 906A. BHA 905 may include a drill tool 940 operatively coupled to a drill string 906A which may be moved axially within a drilled wellbore 918 as attached to the drill string 906A. During operation, drill tool 940 penetrates the earth 901 and thereby creates wellbore 918. BHA 905 provides directional control of drill tool 940 as it advances into earth 901. Drill string 906A can be mounted with various measurement tools (not shown) such as, but not limited to, MWD and LWD tools, that may be configured to take downhole measurements of drilling conditions.

Fluid or "drilling fluid" from a mud tank 920 may be pumped downhole using a mud pump 922 powered by an adjacent power source, such as a prime mover or motor 924. The drilling fluid may be pumped from mud tank 920, through a stand pipe 926, which feeds the drilling fluid into drill string 906A and conveys the same to drill tool 940. The drilling fluid exits one or more nozzles arranged in drill tool 940 and in the process cools drill tool 940. After exiting drill tool 940, the mud circulates back to the surface 910 via the annulus defined between the wellbore 918 and the drill string 906A, and in the process, returns drill cuttings and debris to the surface. Some of the drilling fluid contaminates the formation fluid as mud filtrate, especially during the early stages of extraction. The cuttings and mud mixture are passed through a flow line 928 and are processed such that a cleaned mud is returned down hole through the stand pipe 926 once again.

A controller 960 including a processor 961 and a memory 962 can be communicatively coupled to sensing tool 912A of sensing tool 912A. While sensing tool 912A may be placed near the bottom of wellbore 918, and extend for a few inches above drill tool 940, a communication channel may be established by using electrical signals or mud pulse telemetry for most of the length of tool string 806 from drill tool 940 to controller 960. In certain embodiments, sensing tool 912A can obtain real time measurements of an amount of a clean formation fluid, and real time measurements of an amount of a contaminant in the clean formation fluid (e.g., mud filtrate 151). In addition, drilling system 900A can be configured with one or more additional tools to obtain real time property measurements of a fluid comprising a formation fluid downhole.

Memory 962 includes commands which, when executed by processor 961 cause controller 960 to perform steps in methods consistent with the present disclosure. More specifically, controller 960 may provide commands to and receive data from sensing tool 912A during operation. For example, in some embodiments, controller 960 may receive information from sensing tool 912A about drilling conditions in wellbore 918 and controller 960 may provide a command to BHA 905 to modify certain drilling parameters. For example, controller 960 may provide a command to adjust or change the drilling direction of drill tool 940 based on a message contained in information provided by sensing tool 912A. In that regard, the information provided by sensing tool 912A to controller 960 may include certain drilling conditions, such as physical or chemical properties of the formation fluid in the subterranean environment. More generally, sensing tool 912A may provide data such as gas-oil-ratio (GOR) content, a methane concentration, a $CO_2$ concentration, or a hydrocarbon content of the formation fluid in the wellbore. Accordingly, controller 960 may use processor 961 to determine a characteristic of the sample in a medium surrounding drill tool 940 using the data collected from the sensing tool 912A.

Figure 9B:
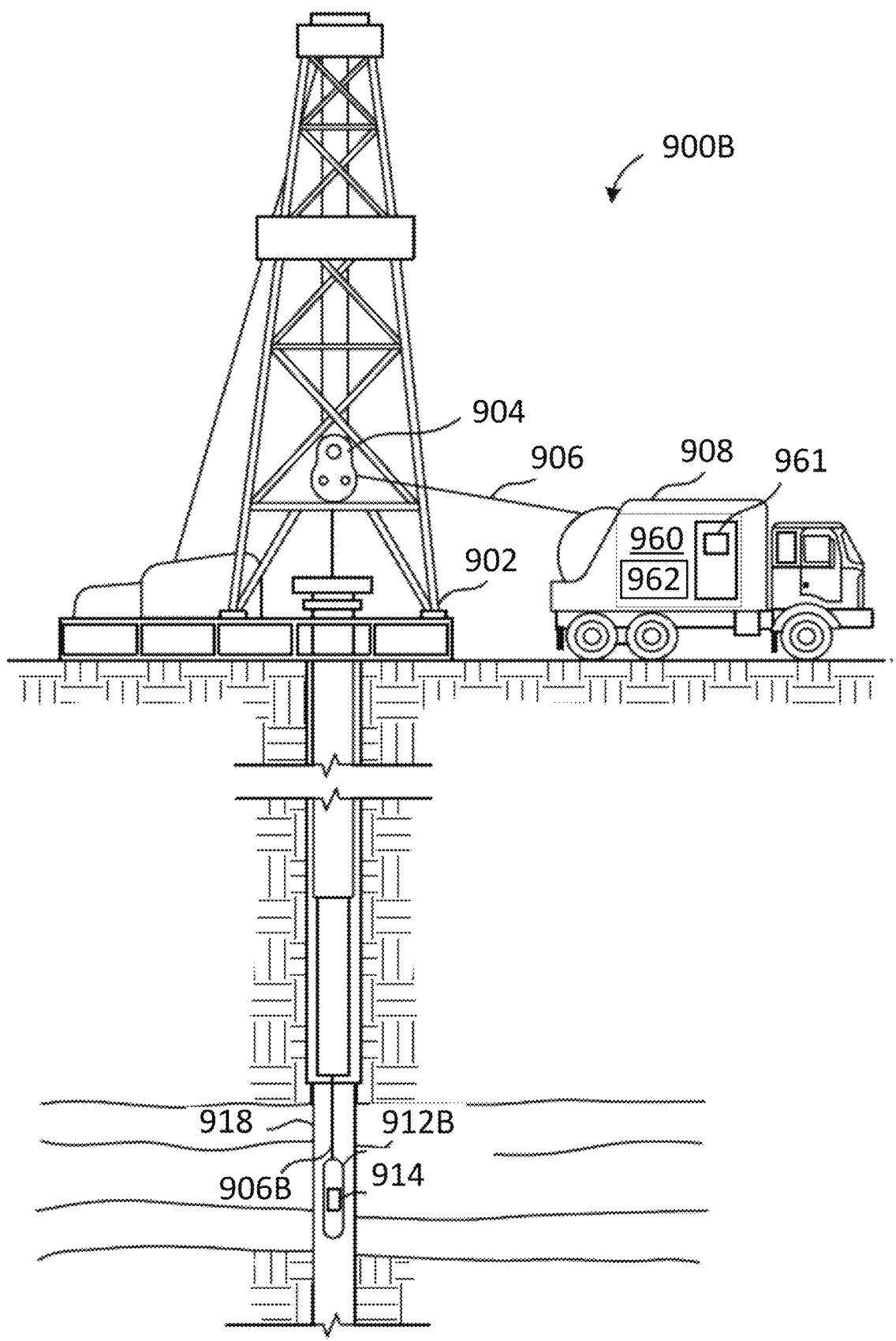
FIG. 9B illustrates a wireline system configured to measure an ion concentration of a sample fluid during formation testing and sampling with an optical computing device.

FIG. 9B illustrates a wireline system 900 configured to measure an ion concentration of a sample fluid during formation testing and sampling with an optical computing device. After drilling of wellbore 918 is complete, it may be desirable to know more details of types of formation fluids and the associated characteristics through sampling with use of a wireline formation tester. System 900 may include a wireline logging tool 912B that forms part of a wireline logging operation that can include one or more optical computing devices 914 as described herein (e.g., optical computing devices 101, 501, 601, 701 or 801 cf. FIGS. 1, and 5-7). Accordingly, any one of optical computing devices 914 may include an ICE according to embodiments disclosed herein (e.g., ICE 202, cf. FIG. 2), and an ion-selective substrate (e.g., ion-selective substrates 100 and 700, cf. FIGS. 1, 5, and 7). System 900 may include a derrick 902 that supports a traveling block 904. Wireline logging tool 912, such as a probe or sonde, may be lowered by wireline or logging cable 906B into wellbore 918. Tool 912 may be lowered to the bottom of the region of interest and subsequently pulled upward at a substantially constant speed by wireline or logging cable 906B.

Any measurement data generated by wireline logging tool 912B and its associated optical computing devices 914 can be communicated to a surface logging facility 908 for storage, processing, and/or analysis. Logging facility 908 may be provided with controller 960, including processor 961 and memory 962 configured to perform various types of signal processing. Controller 960 may determine a reservoir quality based on a measurement of the ion concentration of an extracted sample fluid from wellbore 918. The reservoir quality may be associated with the ability to extract a high value hydrocarbon from a formation surrounding the wellbore. Many factors may determine a reservoir quality, including pore geometry in the formation surrounding the wellbore and other physical properties of the fluid such as viscosity, density, pH, and ion concentration, among others. Controller 960 may determine at least some of the above physical properties using measurements obtained with optical computing devices 914 as disclosed herein.

Figure 10:
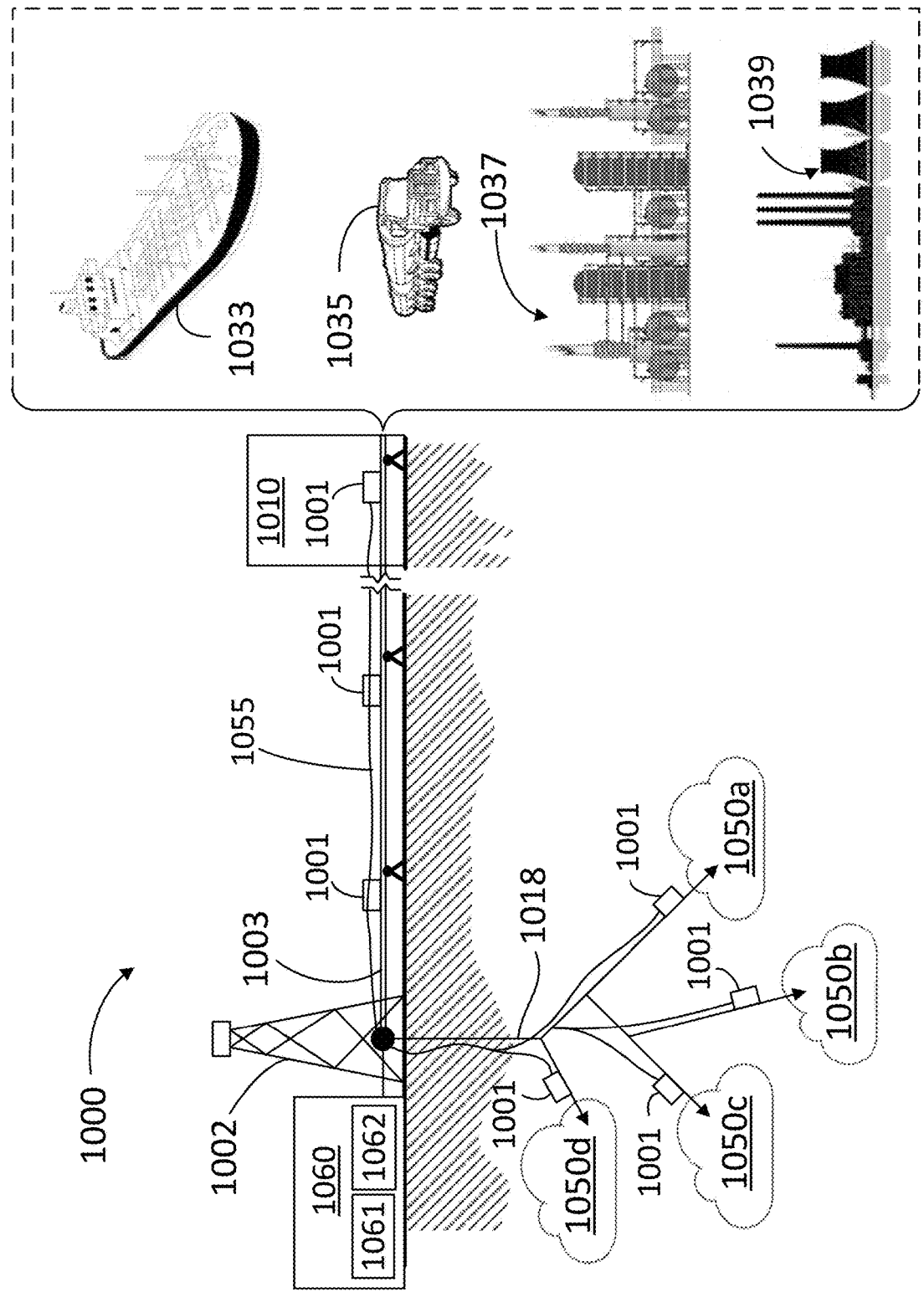
FIG. 10 illustrates a field deployment of a fluid analysis system including multiple optical computing devices for measuring an ion concentration of a sample fluid coupled through an optical fiber link.

FIG. 10 illustrates a field deployment of a fluid analysis system 1000 including multiple optical computing devices 1001 deployed in wellbore 1018 for measuring an ion concentration of a sample fluid. In some embodiments, optical computing devices 1001 may be optically coupled with one another in a distributed arrangement via an optical fiber 1055 (e.g., optical fiber 855, cf. FIG. 8). Wellbore 1018 may include a plurality of extraction reservoirs including hydrocarbon production zones 1050*a*, 1050*b*, 1050*c*, and 1050*d*, as illustrative examples (collectively referred to hereinafter as "production zones 1050"). For example, in some embodiments, the ion concentration in fluids extracted from each of production zones 1050 may be different, and indicative of each specific location. In that regard, some embodiments of fluid analysis system 1000 include specifically injecting a fluid having a recognizable ion concentration into a distant well (not shown) which is detected in wellbore 1018. Fluids containing different ions may be injected from different wells around the wellbore of interest, 1018. Accordingly, measuring the ion concentration of an extracted fluid may indicate the origin of the fluid (e.g., whether or not it is the same fluid as was originally injected into the wellbore). Moreover, the ion concentration in the extracted fluid may indicate whether the fluid was extracted from either one of production zones 1050*a*, 1050*b*, 1050*c*, or 1050*d*. In some embodiments, fluid analysis system 1000 is deployed for long periods of time such as months, years, or even longer periods of time as allowed by the resiliency of optical computing devices 1001 over harsh environmental conditions.

At least one of optical computing devices 1001 includes an ion-selective substrate as disclosed herein (cf. ion-selective substrates 100 and 700, cf. FIGS. 1 and 7). In fluid analysis system 1000, a derrick 1002 provides support for hydrocarbon extraction and measurement equipment deployed through wellbore 1018. At the surface, fluid analysis system 1000 may include a controller 1060 having a processor 1061 and a memory 1062. Controller 1060, processor 1061, and memory 1062 may be as described in detail above (e.g., controllers 160 and 960, processors 161 and 961, and memories 162 and 962 respectively, cf. FIGS. 1 and 9). In some embodiments, controller 1060 is configured to determine the origin of an extracted fluid from the ion concentration measured with each of optical computing devices 1001. Accordingly, controller 1060 may be configured to determine whether an extracted fluid comes from production zones 1050, or if it was injected at the surface.

Wellbore 1018 may be a subterranean wellbore or an undersea operation, in which case derrick 1002, controller 1060, and a portion of a pipeline 1003 may be floating over the sea. The extracted hydrocarbon is transported through pipeline 1003 to a delivery port 1010, from which the hydrocarbon is transferred to a transportation vehicle (e.g., vessel 1033 or truck 1035), a refinery 1037, or a power plant 1039, among others.

Figure 11:
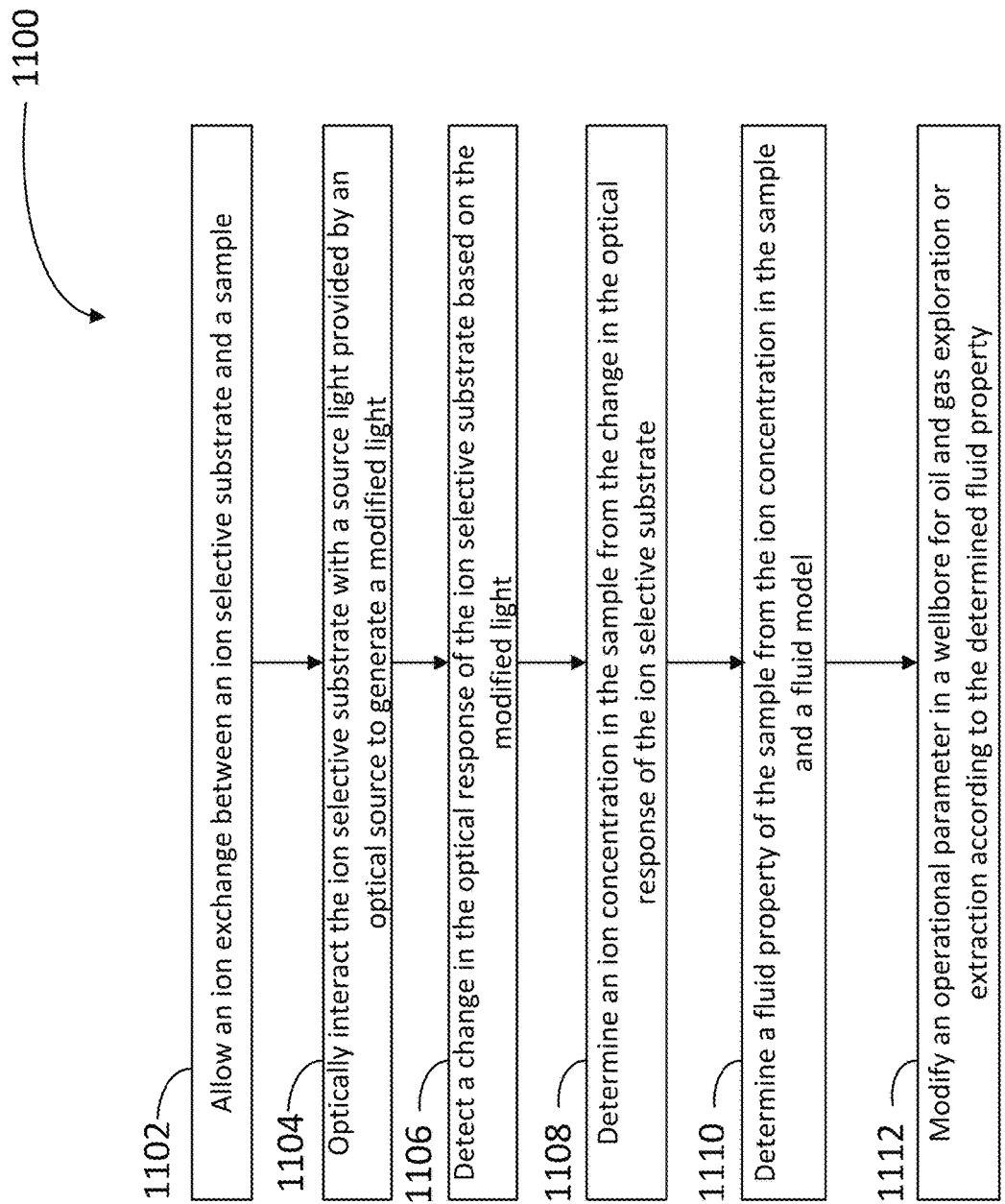
FIG. 11 illustrates a flow chart including steps in a method for measuring an ion concentration of a sample fluid.

FIG. 11 illustrates a flow chart including steps in a method 1100 for measuring an ion concentration in a sample fluid. In some embodiments, steps in method 1100 may be performed at least partially by a controller including a processor and a memory (e.g., controllers 160, 960, or 1060, processors 161, 961, or 1061, and memories 162, 962, and 1062, cf. FIGS. 1A-B, 9, and 10). The memory may store commands that, when executed by the processor, cause the controller to perform at least some of the steps in method 1100. Accordingly, methods consistent with method 1100 may be performed in connection with a system including an optical computing device having an ICE and an ion-selective substrate (e.g., systems 10, 50, 60, 70, and 80, ICE 102 and ion-selective substrates 100 and 700, cf. FIGS. 1A-B, and 5-8). Moreover, methods consistent with method 1100 may include using an optical source to provide an illumination light for the optical computing device, an optical waveguide such as an optical fiber, and a detector (e.g., optical source 140, illumination light 141, optical waveguide 610, and detector 130, cf. FIGS. 1 and 6).

Methods consistent with method 1100 may include fewer steps than illustrated, or other steps in addition to at least one of the steps in method 1100. Moreover, methods consistent with the present disclosure may include at least one or more of the steps in method 1100 performed in a different sequence. For example, some embodiments consistent with the present disclosure may include at least two steps in method 1100 performed overlapping in time, or substantially simultaneously in time.

Step 1102 includes allowing an ion exchange between an ion selective substrate and a sample. In some embodiments, step 1102 may include exchanging ions between the material and the sample to reach equilibrium. In other embodiments, step 1102 is taken before the sample has reached equilibrium with its surroundings so that a transient response is obtained (e.g., in water cut measurements). In some embodiments, step 1102 includes exchanging ions between a second material and the sample, wherein the second material has an affinity optimized for a second ion.

Step 1104 includes optically interacting the ion selective substrate with a source light provided by an optical source, to generate a modified light. In some embodiments, step 1104 may include optically interacting the ion selective substrate with an ICE to generate the modified light.

Step 1106 includes detecting a change in the optical response of the ion selective substrate based on the modified light. In some embodiments, step 1106 includes measuring a property of the modified light. For example, in some embodiments, step 1106 includes measuring at least one of an intensity, a polarization, a phase, a wavelength, or any combination of the above properties of the modified light.

Step 1108 includes determining an ion concentration in the sample from the change in the optical response of the ion selective substrate. Step 1108 may include determining first an absorbed value of the ion in the material from the change in the optical response of the material. Further, step 1108 may include determining the ion concentration in the sample from the absorbed value assuming ion-transmission equilibrium between the material and the sample. In some embodiments, step 1108 includes identifying a temperature, a pressure, and a pH of the sample as factors in determining the ion concentration in the sample. In some embodiments, step 1108 may include determining the origin of an extracted fluid from the ion concentration in the sample. Accordingly, the origin of the extracted fluid may be any one of a plurality of production zones in a wellbore (e.g., production zones 1050, cf. FIG. 10), or a fluid injected into the wellbore from the surface.

Step 1110 includes determining a fluid property of the sample from the ion concentration in the sample and a fluid model. In some embodiments, the ion concentration may be the fluid property of interest, which may be directly related to an operational parameter in a wellbore for oil and gas exploration or extraction.

Step 1112 includes modifying an operational parameter in a wellbore for oil and gas exploration or extraction according to the determined fluid property. In some embodiments, step 1112 may include adding into or removing from an injection fluid certain chemical compounds, in order to modify the pH of the injection fluid, or its reactivity with a membrane in the wellbore. For example, the injection fluid may be a drilling mud and its ion content may indicate the chemical stability of a wellbore ion-selective substrate while drilling.

Those skilled in the art will readily appreciate that the methods described herein, or large portions thereof, may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Aspects disclosed herein include:

Aspect A: a device comprising a sample cell configured to interact a fluid sample with an ion selective substrate to modify an optical characteristic of the ion selective substrate according to an ion concentration of the fluid sample, wherein the sample cell is also configured to optically interact an illumination light with the ion selective substrate to generate a sample light; an optical element configured to interact with the sample light to provide a modified light that has a property of the fluid sample; and a detector that receives the modified light and provides an electrical signal proportional to the property of the fluid sample indicated by the modified light; and wherein the ion selective substrate comprises a membrane, the membrane configured to change an optical property in a selected wavelength range, according to the property of the fluid sample.

Aspect B: A system, comprising an optical source configured to provide an illumination light; an optical computing device; and controller, wherein the optical computing device comprises an ion selective substrate placed in a sample cell that interacts a sample with the ion selective substrate to modify an optical characteristic of the ion selective substrate according to an ion concentration in the sample, wherein the sample cell optically interacts the illumination light with the ion selective substrate and generates a sample light; an optical element that interacts with the sample light to provide a modified light that has a property indicative of a property of the sample; and a detector that receives the modified light and provides an electrical signal proportional to the property of the modified light to the controller, and wherein the controller is configured to determine the property of the sample from the property of the modified light; and wherein the ion selective substrate comprises a membrane, the membrane configured to change an optical property in a selected wavelength range, according to the property of the fluid sample.

Aspect C: A method, comprising allowing an ion exchange between an ion selective substrate and a sample; optically interacting the ion selective substrate with a source light provided by an optical source, to generate a modified light, wherein optically interacting the ion selective substrate with the source light comprises optically interacting the ion selective substrate with an optical element to generate the modified light; detecting a change in an optical response of the ion selective substrate based on the modified light; determining a property of the sample from the change in the optical response of the ion selective substrate; determining a fluid property of the sample from the determined property of the sample and a fluid model; and modifying an operational parameter in a wellbore for oil and gas exploration or extraction according to the ion concentration; and wherein the ion selective substrate comprises a membrane, the membrane configured to change an optical property in a selected wavelength range, according to the property of the fluid sample.

Aspects A, B, and C may have one or more of the following additional elements in combination:

Element 1: wherein the ion selective substrate comprises a dye selected to modify the illumination light according to the property of the fluid sample;

Element 2: wherein the optical element comprises multiple alternating layers of material having different thickness and is configured to provide the modified light with an intensity proportional to the property of the fluid sample;

Element 3: wherein the ion selective substrate comprises multiple membranes, each of the multiple membranes configured to change an optical property in a selected wavelength range, according to the property of the fluid sample;

Element 4: wherein each of the multiple membranes comprises multiple materials each having different cutoff concentrations;

5: further comprising a processor configured to determine a fluid property downhole in an oil extraction wellbore, based on the electrical signal;

Element 6: wherein the ion selective substrate contacts the fluid sample in a first region and the ion selective substrate interacts with the illumination light in a second region separated from the first region;

Element 7: wherein the property of the fluid sample is one of viscosity, density, pH, and ion concentration;

Element 8: wherein the detector comprises a transducer configured to modulate a signal in a fiber-optic telecommunication wavelength based on the electric signal proportional to the intensity of the modified light;

Element 9: wherein the ion selective substrate contacts the sample at a first region and the ion selective substrate interacts with the illumination light at a second region separated from the first region;

Element 10: wherein allowing an ion exchange between the ion selective substrate and the sample comprises allowing for the ion exchange between the ion selective substrate and the sample to reach equilibrium; and Element 11: further comprising allowing an ion exchange between a second ion selective substrate and the sample, wherein the second ion selective substrate has an affinity optimized for a second ion.

Those skilled in the art to which this application relates will appreciate that other and further additions, deletions, substitutions and modifications may be made to the described embodiments.

What is claimed is:

1. A device, comprising:
   a sample cell configured to interact a fluid sample with an ion selective substrate to modify an optical characteristic of the ion selective substrate according to an ion concentration of the fluid sample, wherein the sample cell is also configured to optically interact an illumination light with the ion selective substrate to generate a sample light;
   an optical element configured to interact with the sample light to provide a modified light that has a property of the fluid sample; and
   a detector that receives the modified light and provides an electrical signal proportional to the property of the fluid sample indicated by the modified light; and
   wherein the ion selective substrate comprises a membrane, the membrane configured to change an optical property in a selected wavelength range, according to the property of the fluid sample, wherein the membrane comprises multiple materials each having different cutoff concentrations.

2. The device of claim 1, wherein the ion selective substrate comprises a dye selected to modify the illumination light according to the property of the fluid sample.

3. The device of claim 1, wherein the optical element comprises multiple alternating layers of material having different thickness and is configured to provide the modified light with an intensity proportional to the property of the fluid sample.

4. The device of claim 1, wherein the ion selective substrate comprises multiple membranes, each of the multiple membranes configured to change an optical property in a selected wavelength range, according to the property of the fluid sample.

5. The device of claim 4, wherein each of the multiple membranes comprises multiple materials each having different cutoff concentrations.

6. The device of claim 1, further comprising a processor configured to determine a fluid property downhole in an oil extraction wellbore, based on the electrical signal.

7. The device of claim 1, wherein the ion selective substrate contacts the fluid sample in a first region and the ion selective substrate interacts with the illumination light in a second region separated from the first region.

8. The device of claim 1, wherein the property of the fluid sample is one of viscosity, density, pH, and ion concentration.

9. The device of claim 1, wherein the detector comprises a transducer configured to modulate a signal in a fiber-optic telecommunication wavelength based on the electric signal proportional to an intensity of the modified light.

10. A system, comprising:
    an optical source configured to provide an illumination light;
    an optical computing device; and
    a controller,
    wherein the optical computing device comprises:
        an ion selective substrate placed in a sample cell that interacts a sample with the ion selective substrate to modify an optical characteristic of the ion selective substrate according to an ion concentration in the sample, wherein the sample cell optically interacts the illumination light with the ion selective substrate and generates a sample light;
        an optical element that interacts with the sample light to provide a modified light that has a property indicative of a property of the sample; and
        a detector that receives the modified light and provides an electrical signal proportional to the property of the modified light to the controller, and
    wherein the controller is configured to determine the property of the sample from the property of the modified light; and
    wherein the ion selective substrate comprises a membrane, the membrane configured to change an optical property in a selected wavelength range, according to the property of the sample, wherein the membrane comprises multiple materials each having different cutoff concentrations.

11. The system of claim 10, wherein the optical element comprises multiple alternating layers of material having different thicknesses and is configured to provide the modified light with an intensity proportional to the property of the sample.

12. The system of claim 10, wherein the ion selective substrate contacts the sample at a first region and the ion selective substrate interacts with the illumination light at a second region separated from the first region.

13. The system of claim 10, wherein the wherein the ion selective substrate comprises multiple membranes, each of the multiple membranes configured to change an optical property in a selected wavelength range, according to the property of the sample.

14. The system of claim 13, wherein each of the multiple membranes comprises multiple materials each having different cutoff concentrations.

15. A method, comprising:
allowing an ion exchange between an ion selective substrate and a sample;
optically interacting the ion selective substrate with a source light provided by an optical source, to generate a modified light, wherein optically interacting the ion selective substrate with the source light comprises optically interacting the ion selective substrate with an optical element to generate the modified light;
detecting a change in an optical response of the ion selective substrate based on the modified light;
determining a property of the sample from the change in the optical response of the ion selective substrate;
determining a fluid property of the sample from the determined property of the sample and a fluid model; and
modifying an operational parameter in a wellbore for oil and gas exploration or extraction according to an ion concentration of the sample; and
wherein the ion selective substrate comprises a membrane, the membrane configured to change an optical property in a selected wavelength range, according to the property of the sample, wherein the membrane comprises multiple materials each having different cutoff concentrations.

16. The method of claim 15, wherein allowing an ion exchange between the ion selective substrate and the sample comprises allowing for the ion exchange between the ion selective substrate and the sample to reach equilibrium.

17. The method of claim 15, wherein the property of the sample is one of viscosity, density, pH, and ion concentration.

18. The method of claim 15, wherein the ion selective substrate comprises multiple membranes, each of the multiple membranes configured to change an optical property in a selected wavelength range, according to the determined property of the sample.

19. The method of claim 18, wherein each of the multiple membranes comprises multiple materials each having different cutoff concentrations.

20. The method of claim 15, further comprising allowing an ion exchange between a second ion selective substrate and the sample, wherein the second ion selective substrate has an affinity optimized for a second ion.

* * * * *